(12) United States Patent
Pakrooh et al.

(10) Patent No.: US 12,081,261 B2
(45) Date of Patent: Sep. 3, 2024

(54) NARROWBAND ASSISTED ULTRAWIDEBAND MESSAGE SEQUENCES

(71) Applicant: QUALCOMM Incorporated, San Diego, CA (US)

(72) Inventors: Pooria Pakrooh, San Diego, CA (US); Bin Tian, San Diego, CA (US); Stephen Jay Shellhammer, Ramona, CA (US); Le Nguyen Luong, San Diego, CA (US); Koorosh Akhavan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/960,056

(22) Filed: Oct. 4, 2022

(65) Prior Publication Data

US 2023/0361809 A1 Nov. 9, 2023

Related U.S. Application Data

(60) Provisional application No. 63/364,105, filed on May 3, 2022.

(51) Int. Cl.
*H04B 1/71* (2011.01)
*H04B 1/7183* (2011.01)

(52) U.S. Cl.
CPC .................. *H04B 1/7183* (2013.01)

(58) Field of Classification Search
CPC .......................... H04B 1/7183; H04W 56/002
See application file for complete search history.

(56) References Cited

U.S. PATENT DOCUMENTS

| 7,990,310 B2 | 8/2011 | Kwak et al. |
| 2004/0002346 A1 | 1/2004 | Santhoff |

(Continued)

FOREIGN PATENT DOCUMENTS

| WO | 2005004447 A1 | 1/2005 |
| WO | 2021228946 A1 | 11/2021 |

OTHER PUBLICATIONS

Abrar A.S., et al., "Collision Prediction from UWB Range Measurements", arxiv.org, Cornell University Library, 201 Olin Library Cornell University Ithaca, NY 14853, Oct. 9, 2020, XP081782203, pp. 1-12, Abstract Section 4.

(Continued)

*Primary Examiner* — Dac V Ha
(74) *Attorney, Agent, or Firm* — Harrity & Harrity, LLP

(57) ABSTRACT

Various aspects of the present disclosure generally relate to wireless communication. In some aspects, a first wireless communication device may transmit, to a second wireless communication device, a time and/or frequency synchronization message using a first radio frequency (RF) technology, wherein the time and/or frequency synchronization message is used to obtain synchronization information for a second RF technology. The first wireless communication device may transmit, to the second wireless communication device, a first set of ranging measurement signals associated with the second RF technology. The first wireless communication device may receive, from the second wireless communication device, a second set of ranging measurement signals associated with the second RF technology. Numerous other aspects are described.

27 Claims, 19 Drawing Sheets

(56) References Cited

U.S. PATENT DOCUMENTS

| | | |
|---|---|---|
| 2020/0100283 A1 | 3/2020 | Naguib et al. |
| 2020/0304970 A1 | 9/2020 | Jiang et al. |
| 2022/0099818 A1* | 3/2022 | Werner ............... H04W 64/006 |
| 2022/0137177 A1* | 5/2022 | Hammerschmidt ........................ H04W 72/0446 455/456.1 |
| 2022/0271794 A1* | 8/2022 | Aldana ............... H04B 1/7183 |
| 2023/0350052 A1* | 11/2023 | Randall ................ G01S 13/765 |

OTHER PUBLICATIONS

Hammerschmidt J.S., et al., "Narrowband Assisted Multi-Millisecond UWB", IEEE P802.15, 15-21-0409-00-04AB-Narrowband-Assisted-Multi-Millisecond-UWB, IEEE-SA Mentor, Piscataway, NJ USA, vol. 802.15.4ab, Jul. 20, 2021, XP068182680, pp. 1-10.
International Search Report and Written Opinion—PCT/US2023/017584—ISA/EPO—Jun. 29, 2023.

* cited by examiner

ΝARROWBAND ASSISTED
ULTRAWIDEBAND MESSAGE SEQUENCES

CROSS-REFERENCE TO RELATED
APPLICATION

This Patent Applications claims priority to U.S. Provisional Patent Application No. 63/364,105, filed on May 3, 2022, entitled "NARROWBAND ASSISTED ULTRAWIDEBAND MESSAGE SEQUENCES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for narrowband assisted ultrawideband message sequences.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first wireless communication device. The method may include transmitting, to a second wireless communication device, a synchronization message aimed for time and/or frequency synchronization using a first radio frequency (RF) technology, wherein the time and/or frequency synchronization message is used to obtain synchronization information for a second RF technology. The method may include transmitting, to the second wireless communication device, a first set of ranging measurement signals associated with the second RF technology. The method may include receiving, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

Some aspects described herein relate to a method of wireless communication performed by a first wireless communication device. The method may include transmitting, to a second wireless communication device, a time and/or frequency synchronization message using a first RF technology, wherein the time and/or frequency synchronization message is used to obtain synchronization information for a second RF technology. The method may include transmitting, to the second wireless communication device, a first set of ranging measurement signals associated with the second RF technology. The method may include receiving, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

Some aspects described herein relate to a method of wireless communication performed by a first wireless communication device. The method may include transmitting, to a second wireless communication device, a time and/or frequency synchronization message using a first RF technology, wherein the time and/or frequency synchronization message is used to obtain synchronization information for a second RF technology. The method may include transmitting, to the second wireless communication device, a first set of ranging measurement signals associated with the second RF technology. The method may include receiving, from the second wireless communication device, a second set of ranging measurement signals associated with the second RF technology, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

Some aspects described herein relate to a method of wireless communication performed by a first wireless communication device. The method may include transmitting, to a second wireless communication device, a time and/or frequency synchronization message using a first RF technology, wherein the time and/or frequency synchronization message is used to obtain synchronization information for a second RF technology. The method may include transmitting, to the second wireless communication device, a first set of ranging measurement signals associated with the second RF technology. The method may include receiving, from the second wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals.

Some aspects described herein relate to a first wireless communication device. The first wireless communication device may include a memory and one or more processors coupled to the memory. The one or more processors may be configured to cause the first wireless communication device to transmit, to a second wireless communication device, a time and/or frequency synchronization message using a first RF technology, wherein the time and/or frequency synchronization message is used to obtain synchronization information for a second RF technology. The one or more processors may be configured to cause the first wireless communication device to transmit, to the second wireless communication device, a first set of ranging measurement signals associated with the second RF technology. The one or more processors may be configured to cause the first wireless communication device to receive, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

Some aspects described herein relate to a first wireless communication device. The first wireless communication device may include a memory and one or more processors coupled to the memory. The one or more processors may be configured to cause the first wireless communication device to transmit, to a second wireless communication device, a time and/or frequency synchronization message using a first RF technology, wherein the time and/or frequency synchronization message is used to obtain synchronization information for a second RF technology. The one or more processors may be configured to cause the first wireless communication device to transmit, to the second wireless communication device, a first set of ranging measurement signals associated with the second RF technology. The one or more processors may be configured to cause the first wireless communication device to receive, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

Some aspects described herein relate to a first wireless communication device. The first wireless communication device may include a memory and one or more processors coupled to the memory. The one or more processors may be configured to cause the first wireless communication device to transmit, to a second wireless communication device, a time and/or frequency synchronization message using a first RF technology, wherein the time and/or frequency synchronization message is used to obtain synchronization information for a second RF technology. The one or more processors may be configured to cause the first wireless communication device to transmit, to the second wireless communication device, a first set of ranging measurement signals associated with the second RF technology. The one or more processors may be configured to cause the first wireless communication device to receive, from the second wireless communication device, a second set of ranging measurement signals associated with the second RF technology, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

Some aspects described herein relate to a first wireless communication device. The first wireless communication device may include a memory and one or more processors coupled to the memory. The one or more processors may be configured to cause the first wireless communication device to transmit, to a second wireless communication device, a time and/or frequency synchronization message using a first radio frequency (RF) technology, wherein the time and/or frequency synchronization message is used to obtain synchronization information for a second RF technology. The one or more processors may be configured to cause the first wireless communication device to transmit, to the second wireless communication device, a first set of ranging measurement signals associated with the second RF technology. The one or more processors may be configured to cause the first wireless communication device to receive, from the second wireless communication device, a second set of ranging measurement signals, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals.

Some aspects described herein relate to a non-transitory computer-readable medium that stores a set of instructions for wireless communication by a first wireless communication device. The set of instructions, when executed by one or more processors of the first wireless communication device, may cause the first wireless communication device to transmit, to a second wireless communication device, a time and/or frequency synchronization message using a first RF technology, wherein the time and/or frequency synchronization message is used to obtain synchronization information for a second RF technology. The set of instructions, when executed by one or more processors of the first wireless communication device, may cause the first wireless communication device to transmit, to the second wireless communication device, a first set of ranging measurement signals associated with the second RF technology. The set of instructions, when executed by one or more processors of the first wireless communication device, may cause the first wireless communication device to receive, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

Some aspects described herein relate to a non-transitory computer-readable medium that stores a set of instructions for wireless communication by a first wireless communication device. The set of instructions, when executed by one or more processors of the first wireless communication device, may cause the first wireless communication device to transmit, to a second wireless communication device, a time and/or frequency synchronization message using a first RF technology, wherein the time and/or frequency synchronization message is used to obtain synchronization information for a second RF technology. The set of instructions, when executed by one or more processors of the first wireless communication device, may cause the first wireless communication device to transmit, to the second wireless communication device, a first set of ranging measurement signals associated with the second RF technology. The set of instructions, when executed by one or more processors of the first wireless communication device, may cause the first wireless communication device to receive, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

Some aspects described herein relate to a non-transitory computer-readable medium that stores a set of instructions for wireless communication by a first wireless communication device. The set of instructions, when executed by one or more processors of the first wireless communication device, may cause the first wireless communication device to transmit, to a second wireless communication device, a time and/or frequency synchronization message is used to obtain synchronization information for a second RF technology. The set of instructions, when executed by one or more processors of the first wireless communication device, may cause the first wireless communication device to transmit, to the second wireless communication device, a first set of ranging measurement signals associated with the second RF technology. The set of instructions, when executed by one or more processors of the first wireless communication device, may cause the first wireless communication device to receive, from the second wireless communication device, a second set of ranging measurement signals, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

Some aspects described herein relate to a non-transitory computer-readable medium that stores a set of instructions for wireless communication by a first wireless communication device. The set of instructions, when executed by one or more processors of the first wireless communication device, may cause the first wireless communication device to transmit, to a second wireless communication device, a time and/or frequency synchronization message using a first RF technology, wherein the time and/or frequency synchronization message is used to obtain synchronization information for a second RF technology. The set of instructions, when executed by one or more processors of the first wireless communication device, may cause the first wireless communication device to transmit, to the second wireless communication device, a first set of ranging measurement signals associated with the second RF technology. The set of instructions, when executed by one or more processors of the first wireless communication device, may cause the first wireless communication device to receive, from the second wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals.

Some aspects described herein relate to an apparatus for wireless communication. The apparatus may include means for transmitting, to a wireless communication device, a time and/or frequency synchronization message using a first RF technology, wherein the time and/or frequency synchronization message is used to obtain synchronization information for a second RF technology. The apparatus may include means for transmitting, to the wireless communication device, a first set of ranging measurement signals associated with the second RF technology. The apparatus may include means for receiving, from the wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

Some aspects described herein relate to an apparatus for wireless communication. The apparatus may include means for transmitting, to a wireless communication device, a time and/or frequency synchronization message using a first RF technology, wherein the time and/or frequency synchronization message is used to obtain synchronization information for a second RF technology. The apparatus may include means for transmitting, to the wireless communication device, a first set of ranging measurement signals associated with the second RF technology. The apparatus may include means for receiving, from the wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

Some aspects described herein relate to an apparatus for wireless communication. The apparatus may include means for transmitting, to a wireless communication device, a time and/or frequency synchronization message using a first RF technology, wherein the time and/or frequency synchronization message is used to obtain synchronization information for a second RF technology. The apparatus may include means for transmitting, to the wireless communication device, a first set of ranging measurement signals associated with a second RF technology. The apparatus may include means for receiving, from the wireless communication device, a second set of ranging measurement signals associated with the second RF technology, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

Some aspects described herein relate to an apparatus for wireless communication. The apparatus may include means for transmitting, to a wireless communication device, a time and/or frequency synchronization message using a first RF technology, wherein the time and/or frequency synchronization message is used to obtain synchronization information for a second RF technology. The apparatus may include means for transmitting, to the wireless communication device, a first set of ranging measurement signals associated with the second RF technology. The apparatus may include means for receiving, from the wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, RF chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
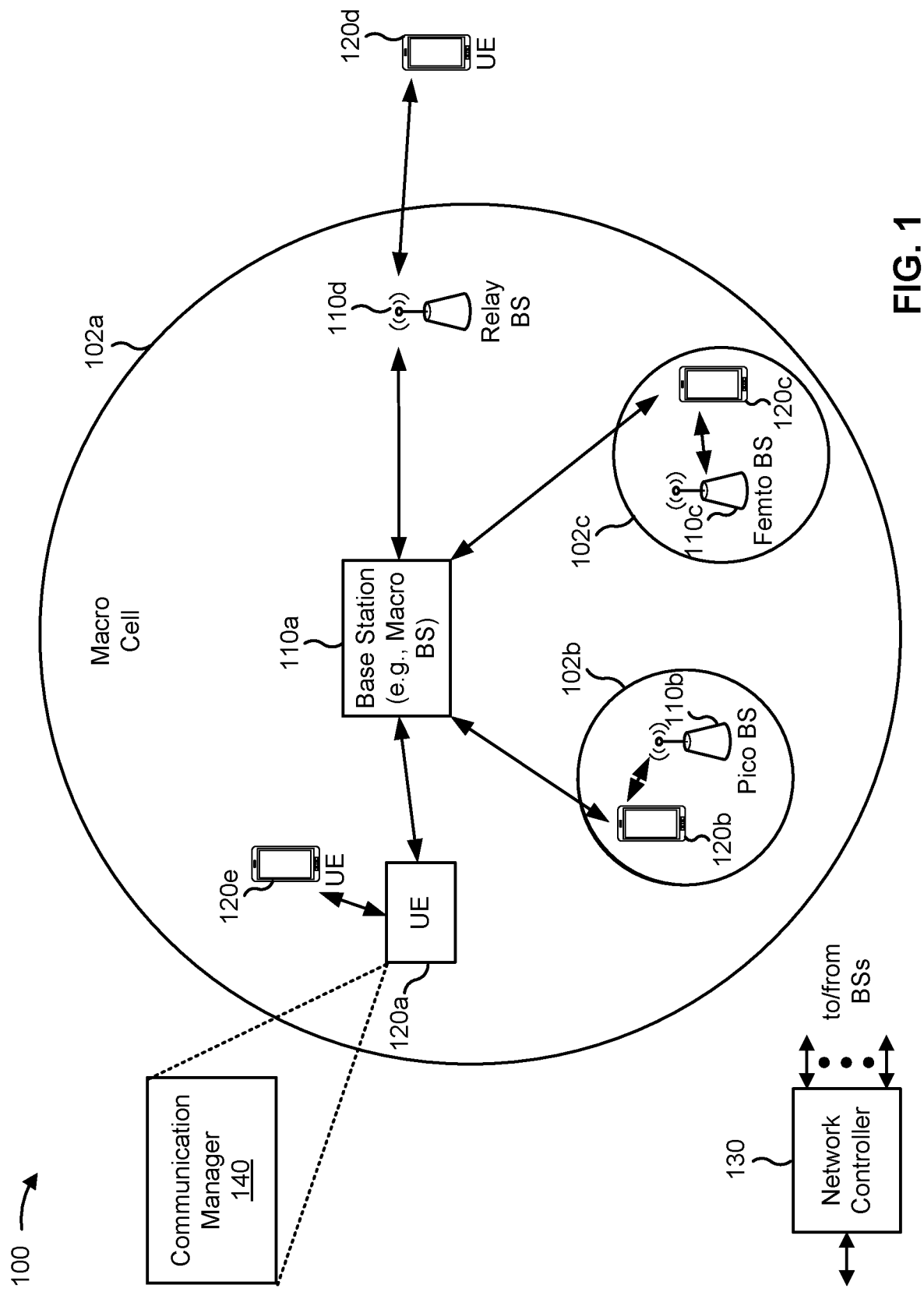
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (O-RAN) architecture or the like. In such aspects, one or more of a centralized unit (CU), a distributed unit (DU), a radio unit (RU) or the like may individually or collectively perform the functions of the base station 110 described herein.

More particularly, in some aspects, the term "base station" (e.g., the base station 110) or "network node" or "network entity" may refer to an aggregated base station, a disaggregated base station, an integrated access and backhaul (IAB) node, a relay node, and/or one or more components thereof. For example, in some aspects, "base station," "network node," or "network entity" may refer to a CU, a DU, an RU, a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used. A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the first wireless communication device described herein may correspond to the UE 120 and/or may be associated with the UE 120. In some aspects, the first wireless communication device may include a communication manager 140. As described in more detail elsewhere herein, the communication manager 140 of the first wireless communication device may transmit, to a second wireless communication device, a time and/or frequency synchronization message using a first RF technology, wherein the time and/or frequency synchronization message is used to obtain synchronization information for a second RF technology; transmit, to the second wireless communication device, a first set of ranging measurement signals associated with the second RF technology; and receive, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot. In some other aspects, the communication manager 140 of the first wireless communication device may transmit, to a second wireless communication device, a time and/or frequency synchronization message using a first RF technology, wherein the time and/or frequency synchronization message is used to obtain synchronization information for a second RF technology; transmit, to the second wireless communication device, a first set of ranging measurement signals associated with the second RF technology; and receive, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

In some other aspects, the communication manager 140 of the first wireless device may transmit, to a second wireless communication device, a time and/or frequency synchronization message using a first RF technology, wherein the time and/or frequency synchronization message is used to obtain synchronization information for a second RF technology; transmit, to the second wireless communication device, a first set of ranging measurement signals associated with the second RF technology; and receive, from the second wireless communication device, a second set of ranging measurement signals associated with the second RF technology, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

In some other aspects, the communication manager 140 of the first wireless communication device may transmit, to a second wireless communication device, a time and/or frequency synchronization message is used to obtain synchronization information for a second RF technology; transmit, to the second wireless communication device, a first set of ranging measurement signals associated with the second RF technology; and receive, from the second wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals. Additionally, or alternatively, the communication manager 140 of the first wireless communication device may perform one or more other operations described herein.

As indicated above, FIG. 1 is provided as an example. Other examples may differ from what is described with regard to FIG. 1.

Figure 2:
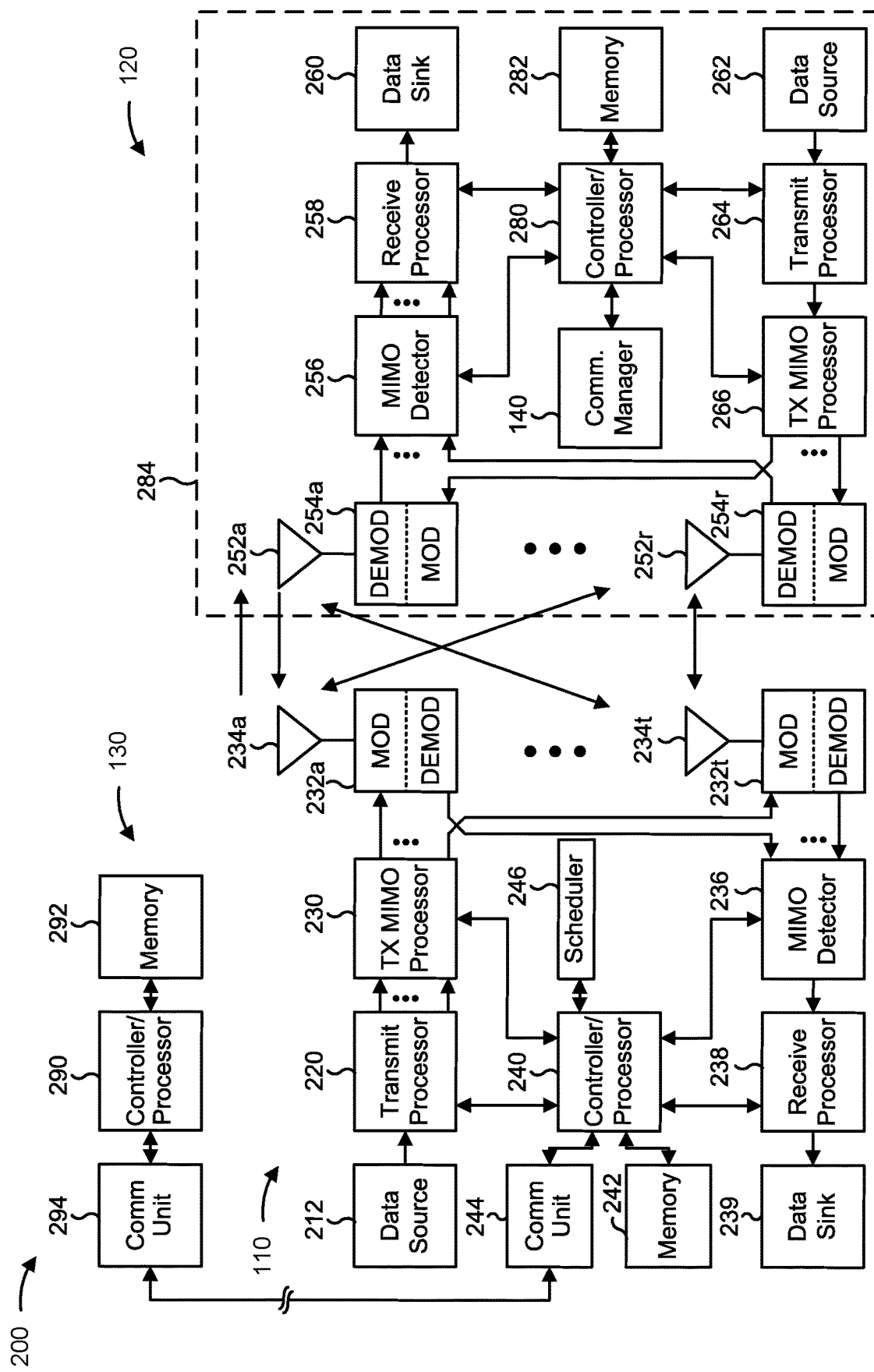
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-19).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-19).

The controller/processor 240 of the base station 110, the controller/processor 280 of the UE 120, and/or any other component(s) of FIG. 2 may perform one or more techniques associated with narrowband assisted ultrawideband message sequences, as described in more detail elsewhere herein. In some aspects, the wireless communication device described herein is the UE 120, is included in the UE 120, or includes one or more components of the UE 120 shown in FIG. 2. The controller/processor 240 of the base station 110, the controller/processor 280 of the UE 120, and/or any other component(s) of FIG. 2 may perform or direct operations of, for example, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, and/or other processes as described herein. In some examples, executing instructions may include running the instructions, converting the instructions, compiling the instructions, and/or interpreting the instructions, among other examples.

In some aspects, the first wireless communication device includes means for transmitting, to a second wireless communication device, a time and/or frequency synchronization message using a first RF technology, wherein the time and/or frequency synchronization message is used to obtain synchronization information for a second RF technology; means for transmitting, to the second wireless communication device, a first set of ranging measurement signals associated with the second RF technology; and/or means for receiving, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

In some other aspects, the first wireless communication device includes means for transmitting, to a second wireless communication device, a time and/or frequency synchronization message using a first RF technology, wherein the time and/or frequency synchronization message is used to obtain synchronization information for a second RF technology; means for transmitting, to the second wireless communication device, a first set of ranging measurement signals associated with the second RF technology; and/or means for receiving, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

In some other aspects, the first wireless communication device includes means for transmitting, to a second wireless communication device, a time and/or frequency synchronization message using a first RF technology, wherein the time and/or frequency synchronization message is used to obtain synchronization information for a second RF technology; means for transmitting, to the second wireless communication device, a first set of ranging measurement signals associated with the second RF technology; and/or means for receiving, from the second wireless communication device, a second set of ranging measurement signals associated with the second RF technology, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

In some other aspects, the first wireless communication device includes means for transmitting, to a second wireless communication device, a time and/or frequency synchronization message using a first RF technology, wherein the time and/or frequency synchronization message is used to obtain synchronization information for a second RF technology; means for transmitting, to the second wireless communication device, a first set of ranging measurement signals associated with the second RF technology; and/or means for receiving, from the second wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals.

In some aspects, the means for the first wireless communication device to perform operations described herein may include, for example, one or more of communication manager 140, antenna 252, modem 254, MIMO detector 256, receive processor 258, transmit processor 264, TX MIMO processor 266, controller/processor 280, memory 282, ultra-wideband transceiver 305 described in connection with FIG. 3, narrowband transceiver 320 described in connection with FIG. 3, and/or processor 335 described in connection with FIG. 3.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
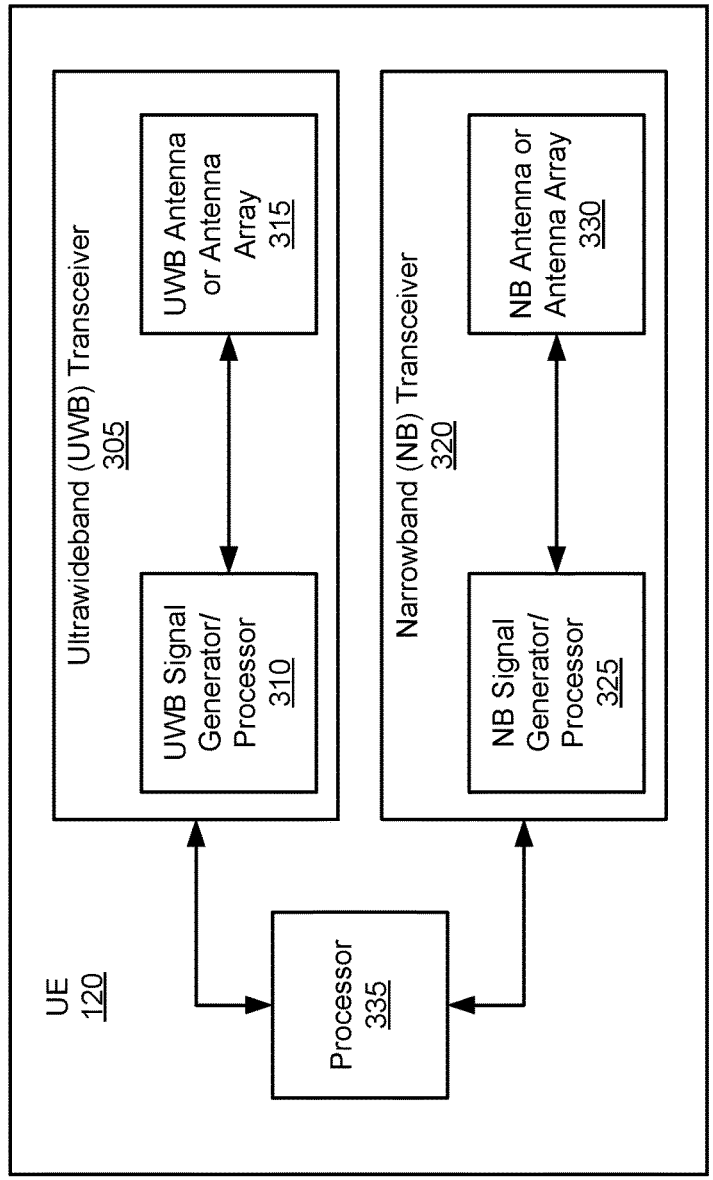
FIG. 3 is a diagram illustrating an example of radio frequency (RF) components of a UE, in accordance with the present disclosure.

FIG. 3 is a diagram illustrating an example 300 of RF components of a UE 120, in accordance with the present disclosure. Although aspects of FIG. 3 are described in the context of a UE 120 for convenience, aspects of the disclosure are not so limited. In other aspects, certain features and components of the UE 120 described in connection with FIG. 3 may be incorporated into another wireless communication device (e.g., a UWB device) without departing from the scope of the disclosure.

In some cases, a UE 120 may be equipped with multiple transceivers capable of operating various RF technologies. For example, in addition to the transceiver components described in connection with FIG. 2 (which, in some cases, may be used to communicate over a wireless network 100, as described), the UE 120 may be equipped with additional transceivers or similar components, such as transceivers associated with short-range wireless communication technologies, or the like. Short-range wireless communication enables wireless communication over relatively short distances (e.g., within 30 meters). Bluetooth protocols are an example of a wireless technology standard for exchanging data over short distances using short-wavelength ultra high frequency (UHF) radio waves from 2.4 gigahertz (GHz) to 2.485 GHz. Bluetooth Low Energy (BLE) protocol is for communication with devices running on low power. Various other short-range wireless communication technologies may operate in a similar wavelength, such as wireless local area network (WLAN) technologies, Zigbee, and ultrawideband (UWB) technologies, which are described in more detail below. In some aspects, certain technologies such as Bluetooth, BLE, WLAN, Zigbee, or the like may operate using a relatively narrow frequency band as compared to UWB technologies, and thus may collectively be referred to as narrowband (NB) technologies.

As shown in FIG. 3, in some cases the UE 120 may include components for communicating using one or more short-range wireless communication technologies. For example, the UE 120 may include a UWB component, such as the UWB transceiver 305 shown in FIG. 3, or related components. In some cases, the UWB transceiver 305 may include various components enabling UWB communication, such as a UWB signal generator/processor 310 and/or a UWB antenna or antenna array 315. As shown, the UWB signal generator/processor 310 and the UWB antenna or antenna array 315 may be in communication with one another (for example, via one or more buses and/or one or more other components).

One or more of the UWB transceiver 305, the UWB signal generator/processor 310, and the UWB antenna or antenna array 315 may enable UWB connectivity. UWB connectivity is a short-range, wireless communication protocol that operates with a very high frequency as compared to other short-range wireless communication technologies (e.g., Bluetooth, WLAN, Zigbee, or the like) and uses a relatively wide frequency band (e.g., 500 MHz or greater) as compared to other short-range wireless communication technologies, which makes UWB useable for high-resolution positioning and localization purposes. In some cases, UWB technology may be used for location discovery, device ranging, or the like. In some cases, a UWB transmitter (e.g., the UWB transceiver 305) may transmit numerous pulses across the wide spectrum frequency, and a corresponding UWB receiver (e.g., a UWB transceiver 305 located at another UWB-enabled device) may translate the pulses into data by listening for a familiar pulse sequence sent by the transmitter.

When multiple UWB devices are near one another (e.g., when two UEs 120 including UWB components such as the UWB transceiver 305 are near one another), the two UWB devices may start ranging, or measuring, a distance from one another. In such cases, the first UWB device (e.g., a UWB which first transmits a UWB communication, sometimes referred to as a ranging measurement signal and/or a UWB measurement signal) may be referred to as an initiator, and the second UWB device may be referred to as a responder. In some cases, measuring a distance between two UWB devices may be referred to as two-way ranging (TWR), because the measurements rely on two-way communication between the two UWB devices. More particularly, in TWR, an initiator and a responder may measure a distance between each other using time of flight (TOF) measurements or the like, such as by multiplying the round trip time of the signal by the speed of light and dividing by two. In some aspects, UWB devices may be able to determine the relative position of peer devices with a line of sight up to 200 meters, or similar distances. In some aspects, a UWB device may be capable of two-dimensional or three-dimensional location by additionally measuring a distance between the UWB device and a fixed beacon or anchor and then using triangulation. In some cases, "TWR" may refer to single-sided TWR or double-sided TWR. "Single-sided TWR" may refer to TWR based on two messages or sets of messages transmitted between an initiator and a responder (e.g., a poll message or set of poll messages sent from the initiator to the responder, and an answer message or set of answer messages sent from the responder to the initiator), while "double-sided TWR" may refer to TWR based on three or more messages or sets of messages transmitted between an initiator and a responder (e.g., the poll and answer messages described above, in addition to a final message or set of final messages sent from the initiator to the responder, and, optionally, a report message or set of report messages sent from the responder to the initiator).

Returning to FIG. 3, the UE 120 may include additional transceivers or components, such as additional transceivers associated with a different short-range wireless communication protocol. For example, the UE 120 may include an NB component, such as the NB transceiver 320 shown in FIG. 3, or related components. In some cases, the NB transceiver 320 may include various components enabling NB connectivity, such as an NB signal generator/processor 325 and/or an NB antenna or antenna array 330. As shown, the NB signal generator/processor 325 and the NB antenna or antenna array 330 may be in communication with one another. In some cases, the NB transceiver 320 and/or other NB components of the UE 120 may be associated with one or more of Bluetooth connectivity, BLE connectivity, WLAN connectivity, Zigbee connectivity, or the like, which may use a relatively narrow frequency band as compared to UWB connectivity and/or which may operate in a relatively low frequency range as compared to UWB connectivity.

In some cases, the UWB components (e.g., the UWB transceiver 305) and/or the NB components (e.g., the NB transceiver 320) may communicate with one another or otherwise coexist with one another. For example, in some cases, the UWB transceiver 305 and/or the NB transceiver 320 may be connected to a processor 335. The processor 335 may control certain functions of the UWB transceiver 305 and/or the NB transceiver 320, including, in some cases, operating the UWB transceiver 305 and/or the NB transceiver 320 in conjunction with one another. For example, in some cases, the processor 335 may control the UWB transceiver 305 and/or the NB transceiver 320 for purposes of performing NB-assisted (NBA) UWB (NBA-UWB) technologies, such as the NBA-UWB technologies described below.

As indicated above, FIG. 3 is provided as an example. Other examples may differ from what is described with regard to FIG. 3.

Figure 4:
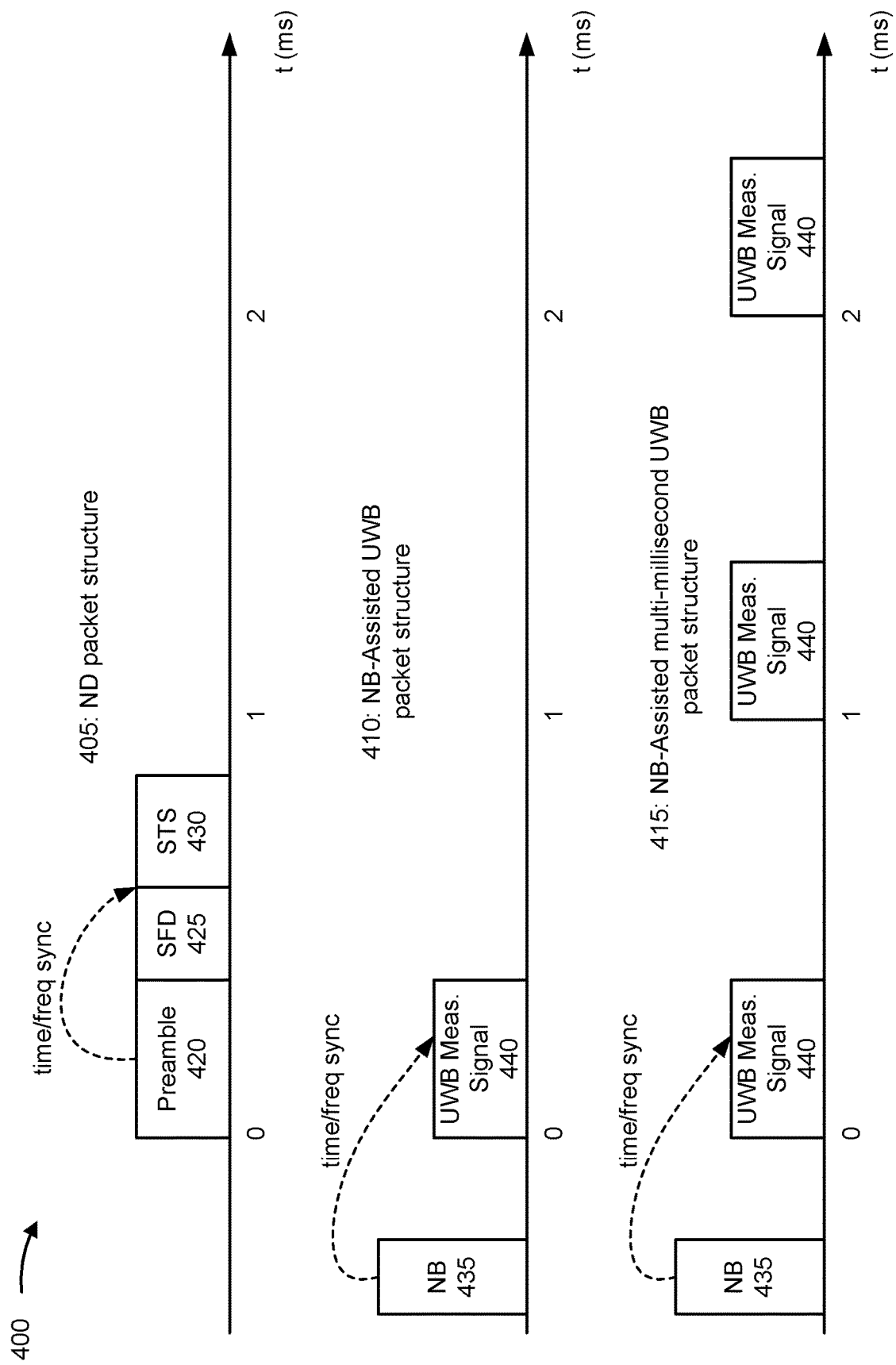
FIG. 4 is a diagram illustrating an example of ultrawideband (UWB) packet structures, in accordance with the present disclosure.

FIG. 4 is a diagram illustrating an example 400 of UWB packet structures, as well as multi-millisecond NB assisted UWB packet structure in accordance with the present disclosure.

As described in connection with FIG. 3, in some cases, UEs 120 or other UWB devices may transmit UWB packets between each other with the aim to estimate the range (or distance) between the devices, or for other purposes such as to estimate the angular direction under which the stations appear with respect to each other. UEs 120 or other UWB devices may also transmit UWB packets to exchange payload data between each other.

As with many other wireless communication systems (e.g., WLAN, Bluetooth, or cellular services), UWB transmissions adhere to certain physical layer (PHY) frame formats, or packet formats (the terms "packet" and "frame" are used interchangeably herein). FIG. 4 illustrates example packet formats for use in UWB transmissions. More particularly, UWB devices may use a no-data (ND) packet structure, as shown by reference number 405, an NBA-UWB packet structure, as shown by reference number 410, an NBA multi-millisecond UWB packet structure, as shown by reference number 415, or other similar packet structures.

The ND packet structure may include a preamble 420, a start of frame delimiter (SFD) 425, and/or a scrambled timestamp sequence (STS) 430. In some aspects, the ND packet structure may be used to synchronize time and/or frequency between two UWB devices. For example, a first UWB device (e.g., an initiator) may transmit the ND packet, and another UWB device (e.g., a responder) may listen for the preamble 420. Once the preamble 420 is detected, the responder may listen for the SFD 425. The responder may use the SFD 425 to acquire frame timing. For example, the UWB packet may be transmitted by the initiator UWB at time 0, and thus the responder UWB device may timestamp the arrival of the UWB packet (e.g., the arrival of the preamble 420 and/or the SFD 425) as time 0. Moreover, the responder may listen for the STS 430, which in some cases may be used for purposes of channel estimation and/or time-stamp validation for secure TOF based range estimation, or the like. In some cases, the preamble 420 may alternatively be referred to as a ranging preamble or a synchronization component (SYNC), and/or the preamble 420 and the SFD 425 (and optionally the STS 430, if equipped) may collectively be referred to as synchronization header (SHR). By receiving the preamble 420, the SFD 425, or/or the STS 430, a responder UWB device may synchronize time and/or frequency with an initiator UWB device, and thus receive UWB transmissions (e.g., preambles 420) for purposes of TWR, or for other purposes.

In other cases, one or more UWB devices may be synchronized according to another RF technology, such as an NB technology. In some cases, this may be referred to as NBA-UWB. Reference number 410 indicates an example of an NBA-UWB packet structure. In this example, an NB packet 435 provides the time and/or frequency synchronization information for a UWB packet, such as for a UWB measurement signal 440 (e.g., a UWB preamble or a similar measurement signal). More particularly, an NB component associated with the initiator device (e.g., the NB transceiver 320 described in connection with FIG. 3) may transmit the NB packet 435, which in some cases may be used to provide initial time and/or frequency synchronization for a subsequent UWB transmission. As shown in FIG. 4, in some cases, the initiator may transmit the NB packet 435 prior to time 0, and then subsequently transmit the UWB measurement signal 440 (which, in some cases, may be just a ranging preamble (e.g., preamble 420) without an SFD 425 and/or an STS 430) at time 0. A responder UWB device may receive the NB packet 435 and synchronize time and/or frequency accordingly in order to properly receive the UWB measurement signal 440 at time 0. Time and frequency can be further synchronized using the UWB communication.

In other cases, multiple UWB transmissions may be synchronized and/or scheduled according to another RF technology, such as an NB technology. For example, in some cases, an NB packet 435 may synchronize and/or schedule multiple UWB transmissions that span more than one millisecond, and thus may be referred to as NBA multi-millisecond UWB. Reference number 415 indicates an example of an NBA multi-millisecond UWB packet structure. In this example, an NB packet 435 provides the time and/or frequency synchronization information for multiple UWB packets, such as multiple UWB measurement signal 440 transmissions. More particularly, an NB component associated with the initiator device (e.g., the NB transceiver 320 described in connection with FIG. 3) may transmit the NB packet 435, which in some cases may include time and/or frequency synchronization information for multiple subsequent UWB transmissions. Put another way, the NB component shares the clock source with the UWB component. In some cases, this initial synchronization process (e.g., setting up and providing initial timing and frequency synchronization for UWB measurements) may be referred to as Phase I or Phase 1.

As shown in FIG. 4, the initiator may transmit the NB packet 435 prior to time 0, and then subsequently transmit a first UWB measurement signal 440 (which, in some cases, may be just a preamble 420 without an SFD 425 and/or an STS 430) at time 0. The initiator UWB may transmit additional packets (e.g., UWB measurement signals 440) a given time period apart, such that a UWB measurement may be performed over a longer duration than for the structures described in connection with reference numbers 405 and 410 (e.g., multiple milliseconds). In some cases, each UWB packet and/or transmission may be referred to as a fragment. Multiple one millisecond fragments may enable combining for purposes of link budget gain, or the like. A responder UWB device may receive the NB packet 435 and synchronize time and/or frequency accordingly in order to properly receive the multiple UWB measurement signals 440 at time 0, time 1, time 2, and so forth. In some cases, the UWB measurement signals 440 may be measured for purposes of a ranging process. The measurement of the UWB fragments using UWB connectivity may be referred to as Phase II or Phase 2. In some cases, the responder UWB device may transmit a measurement report to the initiator UWB device, indicating the measurement performed during Phase II. The measurement report may be transmitted using the same RF connectivity as Phase I (e.g., the same NB connectivity used to transmit the NB packet 435). In some cases, transmitting the measurement report may be referred to as Phase III or Phase 3.

In some cases, an NB technology used to transmit the NB packet 435 may be associated with an Unlicensed National Information Infrastructure (UNIT) radio band, such as a UNII-3 band (e.g., a band associated with a frequency range of 5.725 to 5.850 GHz and a bandwidth of 125 MHz) or another UNII band (e.g., UNII-5 (5.925 to 6.425 GHz frequency range and 500 MHz bandwidth), UNII-6 (6.425 to 6.525 GHz frequency range and 100 MHz bandwidth), UNII-7 (6.525 to 6.875 GHz frequency range and 350 MHz bandwidth), and/or UNII-8 (6.875 to 7.125 GHz frequency range and 250 MHz bandwidth)). Additionally, or alternatively, an NB technology used to transmit the NB packet 435 may be associated with a WLAN, Bluetooth, BLE, and/or an offset quadrature phase-shift keying (O-QPSK) technology such as Zigbee, or the like.

In some aspects, utilizing an NB technology for purposes of time and/or frequency synchronization (e.g., utilizing one of the NBA-UWB packet structures described above) may result in certain benefits as compared to the UWB packet structure, such as enabling frequency hopping and/or enabling the transmission of the initial packet (e.g., the NB packet 435) using a higher transmission power than UWB (e.g., 14 dBm), which may be useful for purposes of range extension or the like. Moreover, the multiple one millisecond fragments may enable combining for purposes of link budget gain, or the like, while using an NB technology for purposes of clock synchronization may reduce the overhead on the UWB spectrum, thus increasing transmission opportunities and improving ranging capabilities. However, NBA-UWB technologies have not yet been adapted for purposes of TWR, and thus their applications are limited.

Some techniques and apparatuses described herein enable the use of NBA-UWB technologies for purposes of TWR, enabling the transmission of the initial synchronization packet using a higher transmission power than UWB, enabling combining of multiple one millisecond fragments for purposes of link budget gain in TWR, and reducing overhead on the UWB spectrum in TWR, thus increasing transmission opportunities and improving TWR capabilities. Aspects of using NBA-UWB technologies for purposes of TWR are described below in connection with FIGS. 5-11.

As indicated above, FIG. 4 is provided as an example. Other examples may differ from what is described with regard to FIG. 4.

FIGS. 5-11 are diagrams illustrating examples of NBA-UWB sequences for single-sided TWR, in accordance with the present disclosure.

Figure 5:
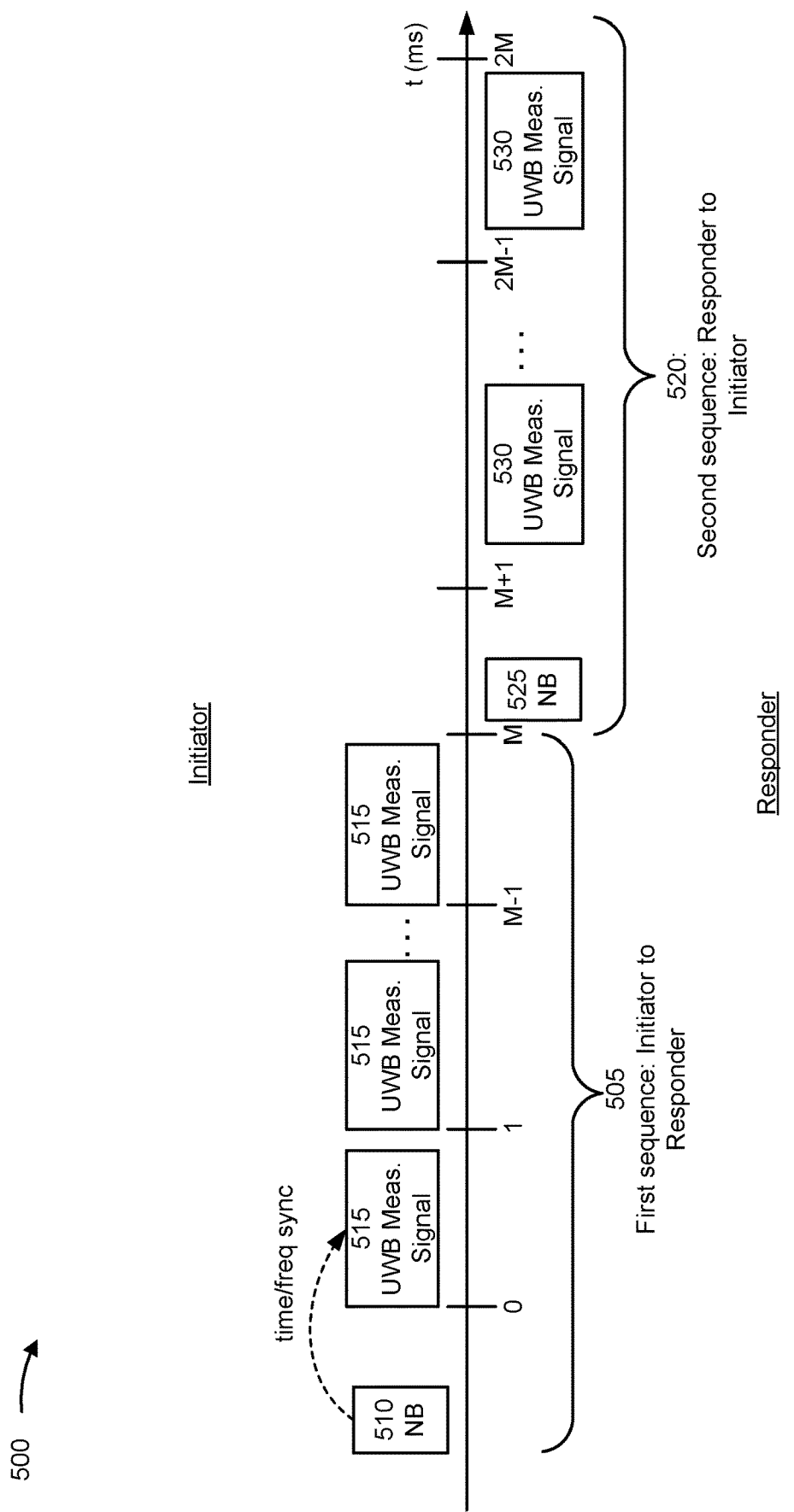
FIGS. 5-11 are diagrams illustrating examples of narrowband-assisted UWB sequences for single-sided two-way ranging, in accordance with the present disclosure.

First, FIG. 5 shows an example 500 of sequential transmissions for purposes of singled-sided TWR. In this example, the messages or packets indicated as "NB" may be associated with a first RF technology, which may be an NB technology (e.g., one of Bluetooth, BLE, a WLAN, or an O-QPSK technology such as Zigbee), and the messages or packets indicated as "UWB Meas. signal" may be associated with a second RF technology, which may be a UWB technology. More particularly, the messages or packets indicated as "UWB Meas. signal" may be ranging measurement signals and/or UWB measurement signals. Additionally, or alternatively, the messages or packets indicated as "NB" may be transmitted via one of UNII-3, UNII-5, UNII-6, UNII-7, or UNII-8.

In the example shown in FIG. 5, there is one measurement sequence (e.g., initiator (Tx) to responder (Rx) transmissions), followed sequentially by another measurement sequence (e.g., responder (Tx) to initiator (Rx) transmissions). In such aspects, and as indicated by reference number 505, in a first sequence (e.g., an initiator to responder sequence) the initiator may transmit a time and/or frequency synchronization message 510 (e.g., a message using a first RF technology, such as an NB technology) that provides time and/or frequency synchronization information for multi-millisecond UWB preamble transmissions or the like, such as multiple ranging measurement signals 515 (e.g., ranging preamble messages). The initiator may then transmit the multiple ranging measurement signals 515 based at least in part on the synchronization information at regular intervals (e.g., one every millisecond), shown as times 0 through M−1.

As indicated by reference number 520, in a second sequence (e.g., a responder to initiator sequence), the responder may optionally transmit a response message 525 (e.g., a message using the first RF technology, such as an NB technology). The response message 525 may provide time and/or frequency synchronization information for the initiator. However, in some other aspects, the responder may synchronize itself with timing and frequency of the initiator (e.g., the responder's NB and UWB times are tied to the time and/or frequency synchronization message 510 (e.g., NB timing) and/or the ranging measurement signals 515 (e.g., UWB timing) received from the initiator), and thus the responder may omit time and frequency synchronization message in the response message 525. Put another way, in some aspects, the responder's clock may be corrected based on the initiator's clock. Additionally, or alternatively, the response message 525 may include a measurement report (e.g., a measurement report associated with measuring the ranging measurement signals 515), while, in some other aspects, a measurement report may be included in a separate NB message, described in more detail below in connection with FIG. 6. Additionally, or alternatively, the response message 525 may include information associated with two-way hand shaking between the initiator and the responder. Additionally, or alternatively, the response message 525 may include information associated with a frequency correction (e.g., the response message 525 may indicate that a frequency correction was performed at the responder due to a hardware limitation, or otherwise). In some other aspects, the response message 525 may be omitted altogether.

As further shown by reference number 520, the responder may transmit multiple ranging measurement signals 530 at regular intervals (e.g., one every millisecond, shown as time M+1 through 2M−1) based at least in part on the synchronization information received from the time and/or frequency synchronization message 510 and/or based at least in part on timing information indicated by the ranging measurement signals 515 transmitted by the initiator. In some aspects, to accommodate different implementations, a flexible interval may be left between NB transmissions (e.g., the time and/or frequency synchronization message 510 and/or the response message 525) and UWB transmissions (e.g., the ranging measurement signals 515, 530). Based at least in part on the transmission and reception of the ranging measurement signals 515, 530, a wireless communication device (e.g., the initiator) may perform single-sided TWR or the like.

In some aspects, the sequential transmission of sets of ranging preambles, as shown in FIG. 5, may be undesirable due to the latency associated with two-way transmission of multiple fragments (e.g., due to the latency associated with transmitting the entire first sequence before receiving the second sequence). Put another way, in the example shown in FIG. 5, each wireless communication device (e.g., the initiator and the responder) waits for reception of all UWB fragments before replying. Accordingly, in some aspects, NB messages and/or UWB messages may be interleaved to avoid such latency.

Figure 6:
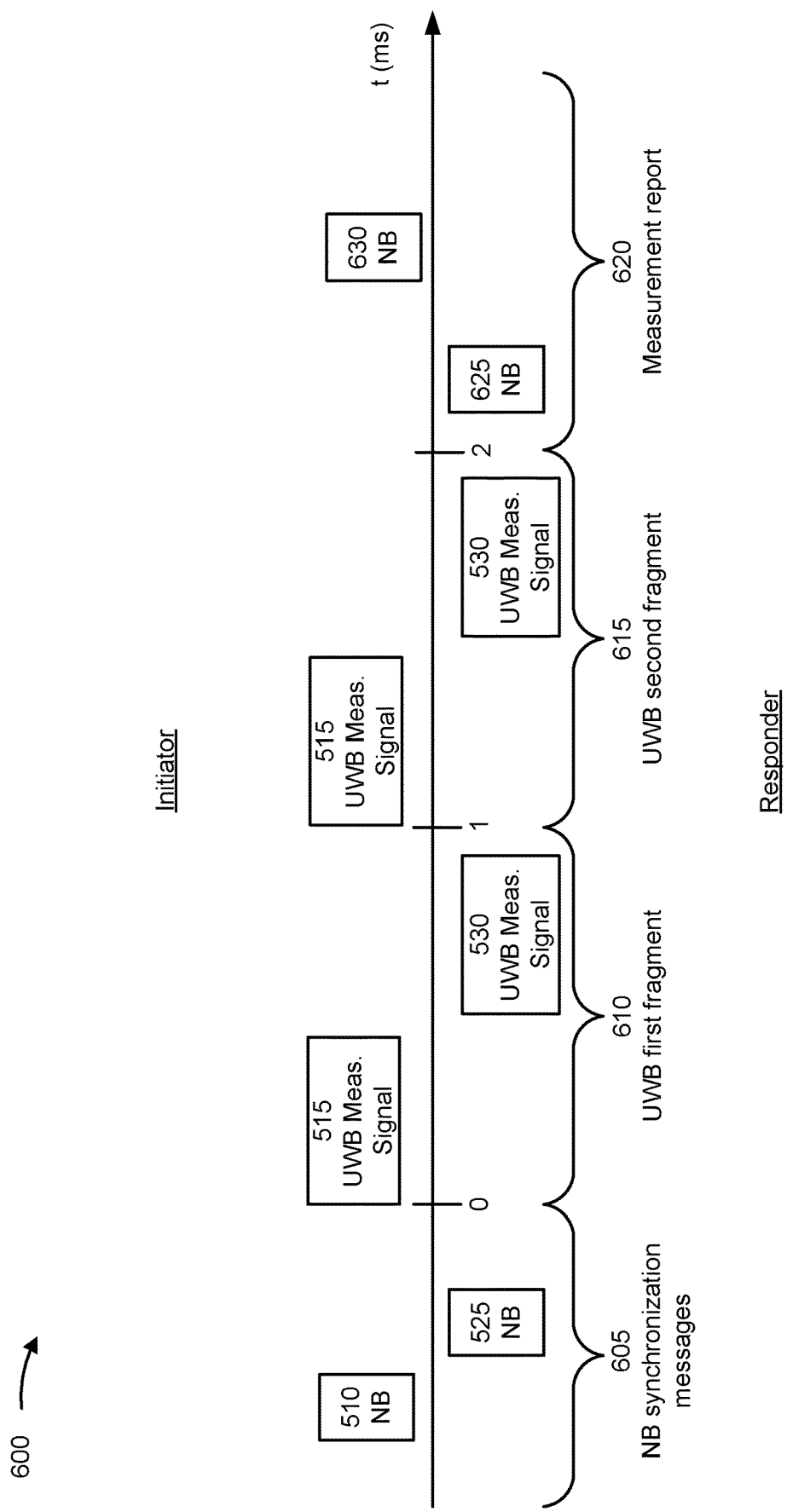

More particularly, FIG. 6 shows an example 600 in which NB messages and/or UWB messages are interleaved with one another. More particularly, as shown by reference number 605, the initiator and the responder may exchange NB synchronization or similar messages prior to UWB transmissions. For example, the initiator may transmit the time and/or frequency synchronization message 510 using an NB technology, and, optionally, the responder may transmit the response message 525 using the NB technology. The initiator and responder may then exchange ranging measurement signals 515, 530 or similar UWB messages in an interleaved fashion. More particularly, as shown by reference numbers 610 and 615, the initiator and the responder may exchange a first pair of UWB fragments (e.g., a first ranging measurement signal 515 transmitted by the initiator and a first ranging measurement signal 530 transmitted by the responder) before exchanging a second pair of UWB fragments (e.g., a second ranging measurement signal 515 transmitted by the initiator and a second ranging measurement signal 530 transmitted by the responder). In some aspects, and as shown by reference number 620, the responder may additionally transmit a report message 625, which may include a measurement report associated with the TWR process. In some aspects, the measurement report may be transmitted using the same connectivity as the time and/or frequency synchronization message 510 (e.g., the NB connectivity), and/or may be sent after the initiator and responder have exchanged the interleaved ranging measurement signals 515, 530. In some aspects, in response to safely receiving the measurement report, the initiator may transmit an acknowledgement (ACK) message 630 using the same connectivity as the measurement report (e.g., the NB connectivity). In such aspects, if the NB report delivery has already succeeded, the ACK message 630 may beneficially release memory for the measurement report until the next ranging block.

In some aspects, once the initiator and the responder have synchronized time and/or frequency in a ranging round as described above, future synchronization (e.g., future transmissions of the time and/or frequency synchronization message 510) may be omitted. In some aspects, a need for a transmission of the time and/or frequency synchronization message 510 in the subsequent TWR rounds may be negotiated by the initiator and the responder. Additionally, or alternatively, in some aspects, if the next TWR round is close-in-time, the time and/or frequency may not change significantly between the two TWR rounds and thus the additional synchronization may be omitted. In some aspects, time and frequency may be further refined during UWB fragments (e.g., using messages transmitted via the ranging measurement signals 515, 530) of the previous TWR round and then may be used for the subsequent TWR rounds without another transmission of the time and/or frequency synchronization message 510.

In some aspects, one or more messages transmitted by the responder (e.g., one or more of the response message 525 and/or the ranging measurement signals 530) may be used to signal an early termination request to the initiator. In some aspects, the responder may determine a number of UWB fragments (e.g., a number of ranging measurement signals 515) to be received, and may signal early termination of the TWR process based at least in part on the number of UWB fragments or the like. For example, in some aspects, the responder may measure a received power of an NB message, and, based at least in part on the received power and/or a difference between NB and UWB link budgets, the responder may compute how many UWB fragments are needed for a particular measurement. In such aspects, the responder may signal the number of UWB fragments needed in the NB response message (e.g., the response message 525). In some other aspects, based at least in part on determining that a UWB received power exceeds a threshold after coherent combining of UWB fragments, the responder may signal early termination to the initiator. In such aspects, early termination may be indicated to the initiator via a UWB measurement signal from the responder (e.g., via one or more ranging measurement signals 530). Moreover, a special sequence design may be utilized for the UWB fragments to communicate early termination.

Figure 7:
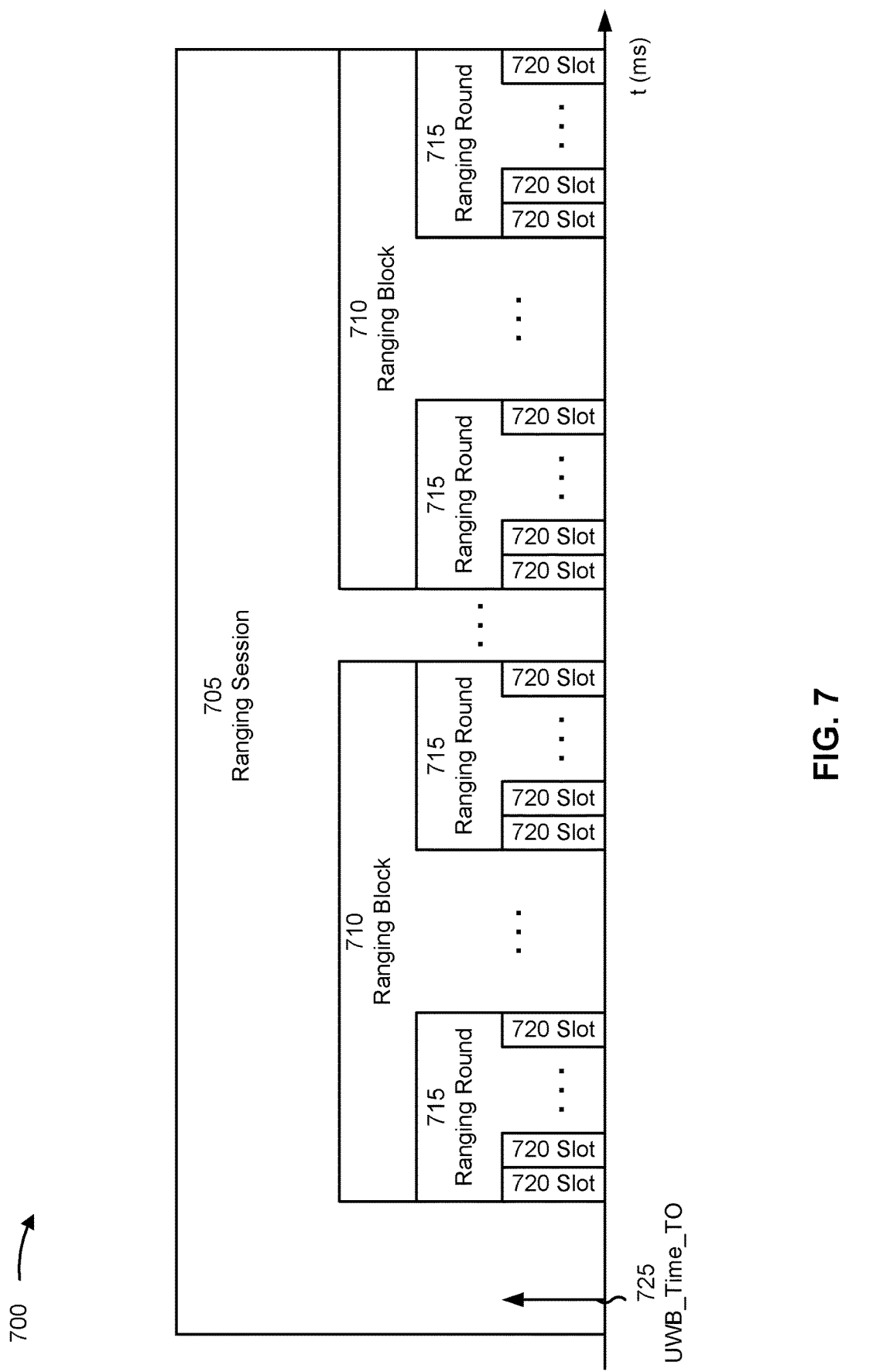
Figure 8:
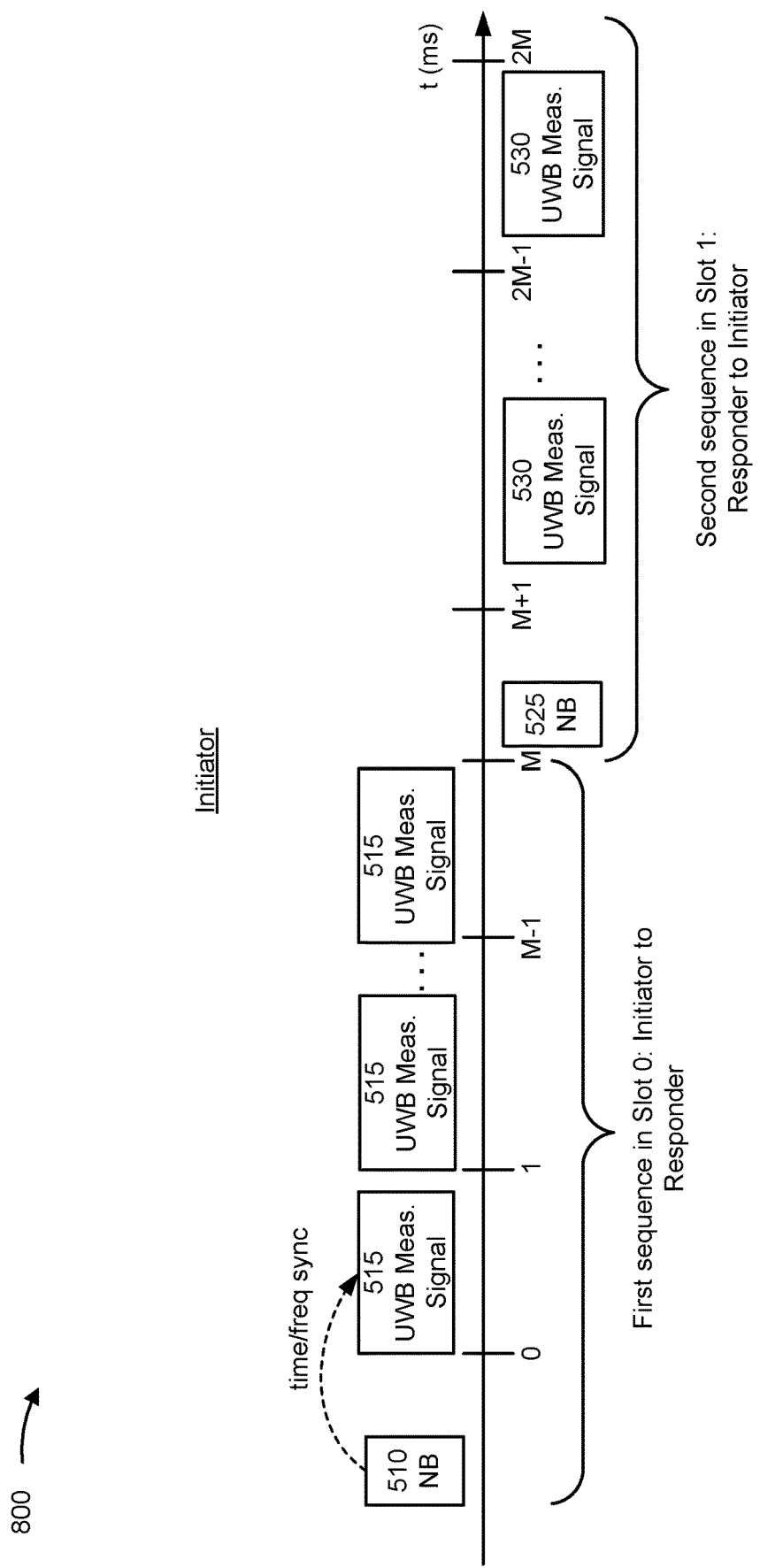
Figure 9:
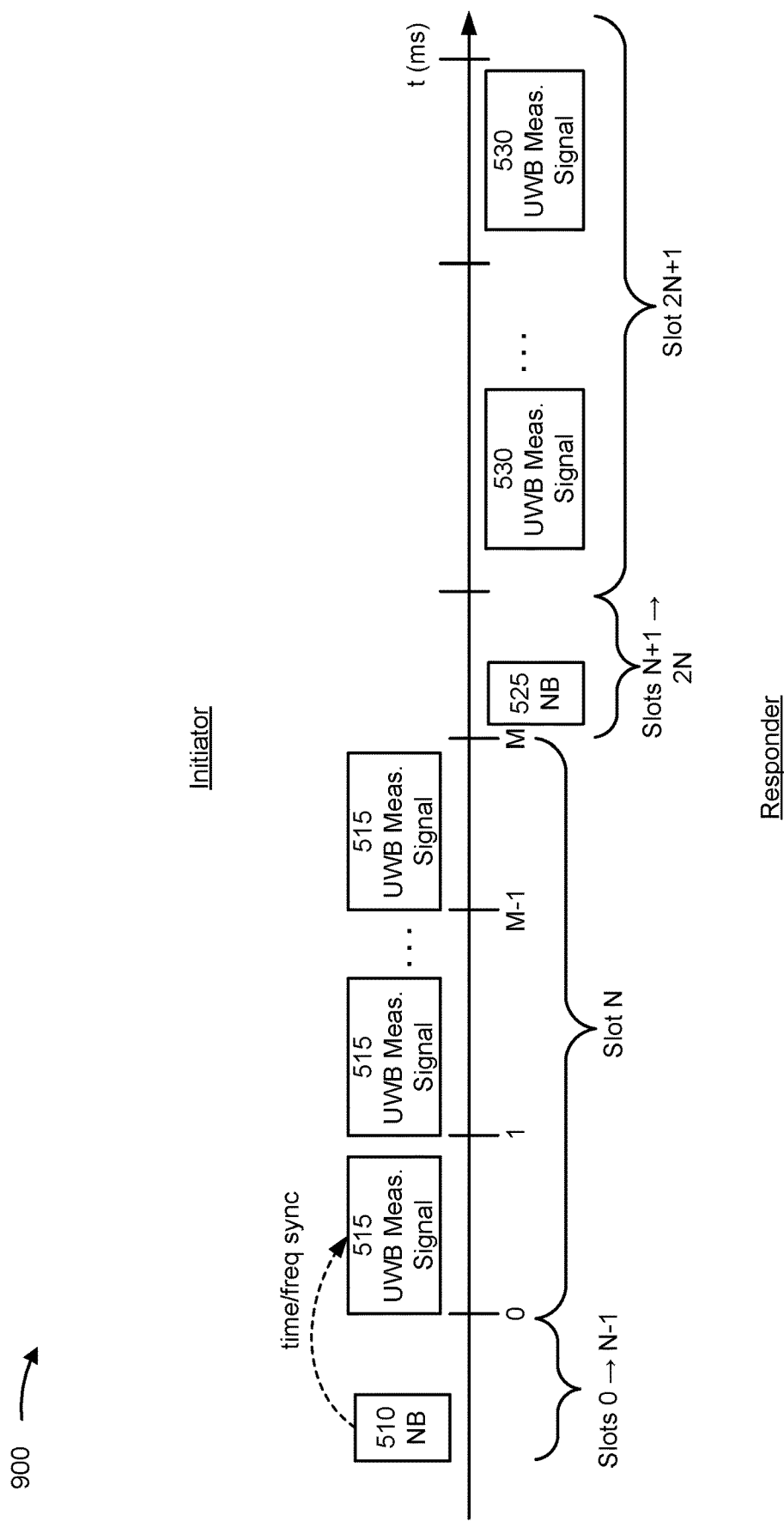
Figure 10:
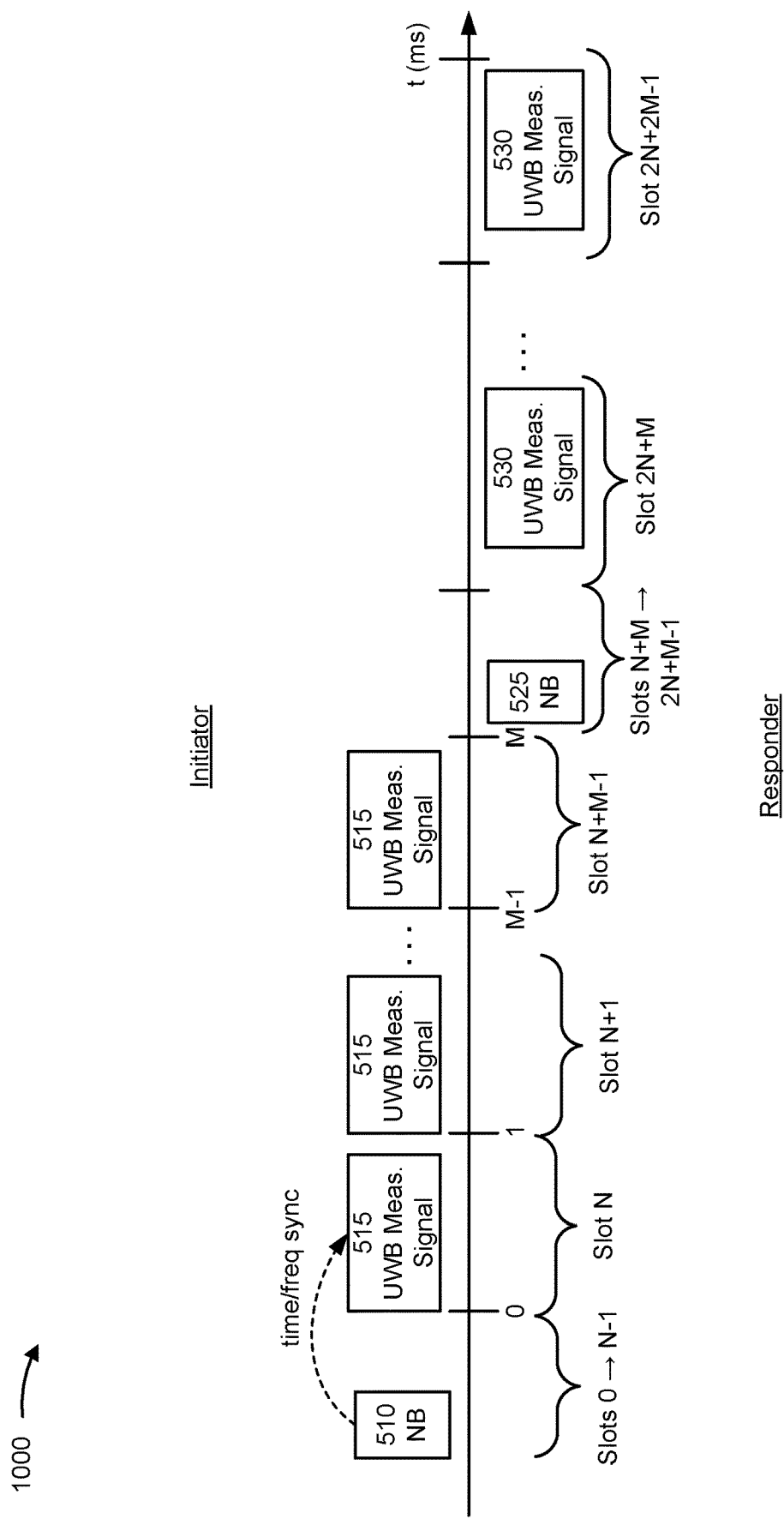

FIG. 7 shows an example 700 of a UWB ranging session 705 according to aspects of the disclosure. In some aspects, an NB technology, such as BLE, may be used for discovery purposes and setting up the UWB ranging session 705 shown in example 700. This may include using an NB connection (e.g., BLE connectivity) to select a UWB channel to use, to configure ranging slot, round, and block durations, or the like. More particularly, in some aspects, the UWB ranging session 705 may include one or more ranging blocks 710, with each ranging block 710 including one or more ranging rounds 715, and with each ranging round 715 including one or more ranging slots 720. In some aspects, the UWB ranging session 705 may be configured to include one UWB measurement per ranging round 715, and/or one ranging round 715 per ranging block 710. Moreover, the ranging block 710, ranging round 715, and/or ranging slot 720 durations may be configured such that each ranging slot 720 is long enough to complete one UWB message, and such that a number of ranging slots 720 per ranging round 715 is large enough to complete one ranging measurement. In some aspects, a ranging slot 720 may be configured to have a sufficient length to include one or more NB messages (e.g., time and/or frequency synchronization message 510, response message 525, report message 625, ACK message 630, or a similar NB message) and/or one or more UWB measurement signals (e.g., ranging measurement signal 515, ranging measurement signal 530, or a similar UWB measurement signal), which is described in more detail below in connection with FIGS. 8-11.

In some aspects, NB connectivity may be used to synchronize a start time of the ranging session 705. For example, the NB connectivity or a component associated with NB connectivity may pass a time parameter (sometimes referred to as UWB Time TO, as shown at reference number 725) to the UWB connectivity or a component associated with UWB connectivity to mark the beginning of the ranging session 705. In some aspects, a duration of each ranging block 710 may determine a frequency of a ranging measurement. For example, in some aspects, one single-sided TWR measurement may be completed per ranging block 710, and thus a shorter duration ranging block 710 may result in more frequent TWR measurements, while a longer duration ranging block 710 may result in less frequent TWR measurements. Moreover, in some aspects, round hopping may be configured such that an index of a ranging round 715 changes from one ranging block 710 to the next ranging block 710. For example, when round hopping is enabled, a round index may be selected in each ranging block 710 based at least in part on a specified round-hopping function.

In some aspects, the ranging session 705 may be based at least in part on the TWR sequences described in connection with FIGS. 5-6. First, as shown by example 800 of FIG. 8, and with respect to the sequential transmission of UWB fragments described in connection with FIG. 5, one ranging slot may be assigned for each sequence of an NB message and corresponding UWB segments. More particularly, the first sequence (e.g., the time and/or frequency synchronization message 510 and the ranging measurement signals 515 transmitted by the initiator) may be assigned to a first ranging slot (e.g., ranging slot 0), and the second sequence (e.g., the response message 525, if used, and the ranging measurement signals 530 transmitted by the responder) may be assigned to a second ranging slot (e.g., ranging slot 1).

Alternatively, as shown by example 900 of FIG. 9, and again with respect to the sequential transmission of UWB fragments described in connection with FIG. 5, each NB transmission may be assigned one or more ranging slots, and each set of UWB fragments may be assigned one ranging slot. More particularly, the first NB message (e.g., the time and/or frequency synchronization message 510 transmitted by the initiator) may be assigned a first set of one or more ranging slots (shown as ranging slots 0 to N−1), the first set of UWB fragments (e.g., the ranging measurement signals 515 transmitted by the initiator) may be assigned to a first ranging slot (e.g., ranging slot N), the second NB message (e.g., the response message 525 transmitted by the responder, if used) may be assigned a second set of one or more ranging slots (shown as ranging slots N+1 to 2N), and the second set of UWB fragments (e.g., the ranging measurement signals 530 transmitted by the responder) may be assigned to a second ranging slot (e.g., ranging slot 2N+1).

Alternatively, as shown by example 1000 of FIG. 10, and again with respect to the sequential transmission of UWB fragments described in connection with FIG. 5, each NB transmission may be assigned one or more ranging slots, and each UWB fragment may be assigned one ranging slot. More particularly, the first NB message (e.g., the time and/or frequency synchronization message 510 transmitted by the initiator) may be assigned a first set of one or more ranging slots (e.g., ranging slots 0 to N−1), a first UWB fragment transmitted by the initiator (e.g., a first ranging measurement signal 515 transmitted by the initiator) may be assigned to a first ranging slot (e.g., ranging slot N), a second UWB fragment transmitted by the initiator (e.g., a second ranging measurement signal 515 transmitted by the initiator) may be assigned to a second ranging slot (e.g., ranging slot N+1) and so forth for the remaining UWB fragments transmitted by the initiator (e.g., up to the ranging slot N+M−1 in the depicted example). Moreover, the second NB message (e.g., the response message 525 transmitted by the responder) may be assigned a second set of one or more ranging slots (shown as ranging slots N+M to 2N+M−1), a first UWB fragment transmitted by the responder (e.g., a first ranging measurement signal 530 transmitted by the responder) may be assigned to a ranging slot following the second NB message (e.g., ranging slot 2N+M), and so forth for the remaining UWB fragments transmitted by the responder (e.g., up to the ranging slot 2N+2M−1 in the depicted example).

Figure 11:
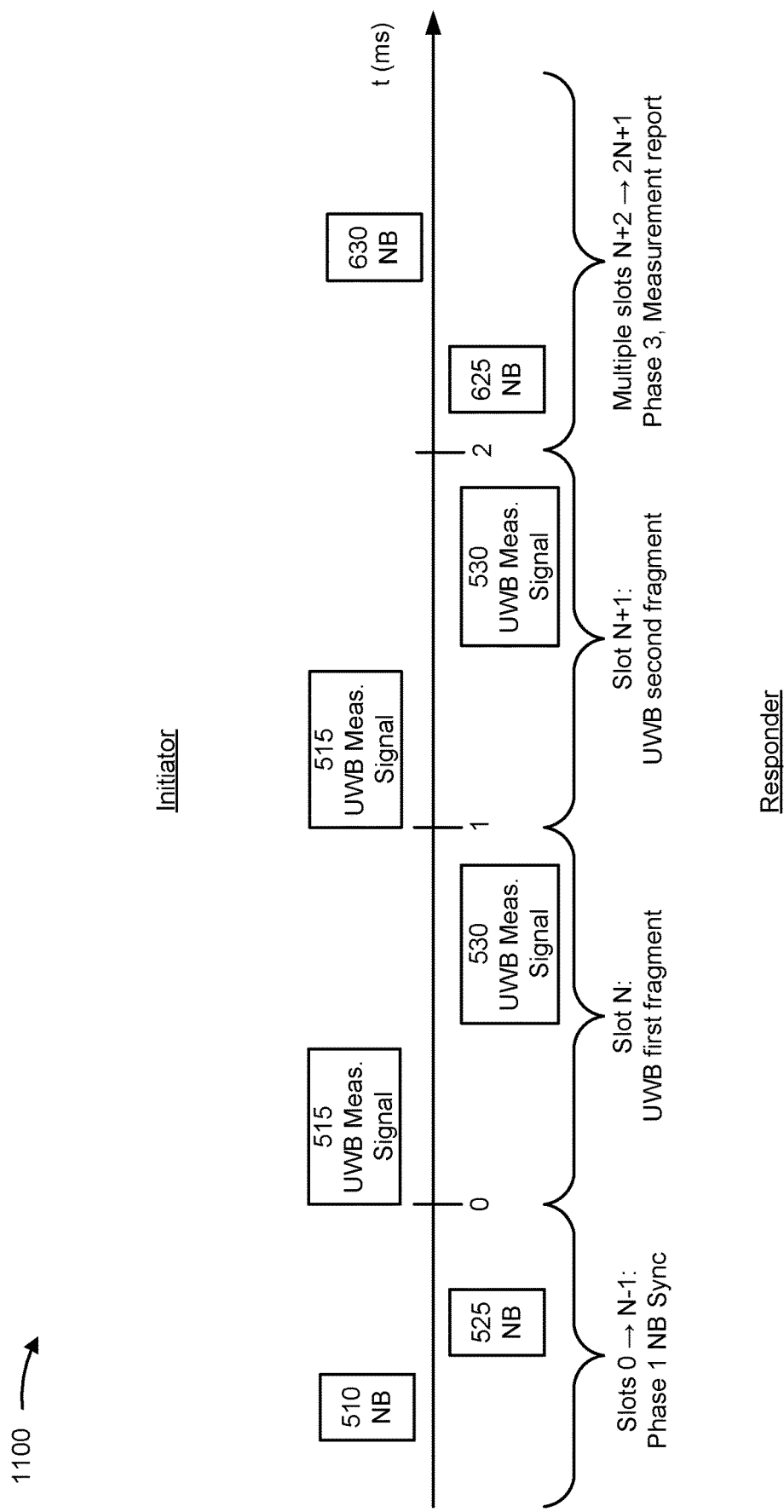

As shown by example 1100 of FIG. 11, and with respect to the interleaved transmission of UWB fragments described in connection with FIG. 6, in some aspects each NB transmission may be assigned one or more ranging slots, and each pair of interleaved UWB fragments may be assigned one ranging slot. More particularly, the first NB message (e.g., the time and/or frequency synchronization message 510 transmitted by the initiator) and, if used, the second NB message (e.g., the response message 525 transmitted by the responder) may be assigned a first set of one or more ranging slots (e.g., ranging slots 0 to N−1). Moreover, a first interleaved pair of UWB fragments transmitted by the initiator and the responder (e.g., a first ranging measurement signal 515 transmitted by the initiator and a first ranging measurement signal 530 transmitted by the responder) may be assigned to a first ranging slot (e.g., ranging slot N), a second interleaved pair of UWB fragments transmitted by the initiator and the responder (e.g., a second ranging measurement signal 515 transmitted by the initiator and a second ranging measurement signal 530 transmitted by the responder) may be assigned to a second ranging slot (e.g., ranging slot N+1), and so forth for the remaining pairs of UWB fragments. Moreover, any additional NB messages (e.g., the report message 625 transmitted by the responder and/or the ACK message 630 transmitted by the initiator) may be assigned a second set of one or more ranging slots (shown as ranging slots N+2 to 2N+1).

In some aspects, the above-described NB messages may need more than one ranging slot (e.g., each NB message duration may be longer than one ranging slot) and thus may be assigned a set of multiple ranging slots, as described. Additionally, or alternatively, in some aspects, there may be a configurable offset between NB messages and UWB fragments based at least in part on negotiation in implementations. Moreover, in some aspects, one or more of the NB messages may be transmitted outside of the ranging session 705. More particularly, in some aspects an NB message transmitted outside of the ranging session 705 (e.g., an NB message transmitted prior to the ranging session 705) may pass a time parameter (e.g., UWB Time TO, as shown at reference number 725) to the UWB connectivity or a component associated with UWB connectivity to mark the beginning of the ranging session 705. Put another way, in some aspects, the NB setup may be completed before implementing the ranging slot structure for UWB messages. This may be because it may be challenging to fit NB transmissions in a fixed number of ranging slots, particularly for implementations in which it is preferable to have a fast turn-around time between NB messages and UWB fragments.

As indicated above, FIGS. 5-11 are provided examples. Other examples may differ from what is described with regard to FIGS. 5-11.

Figure 12:
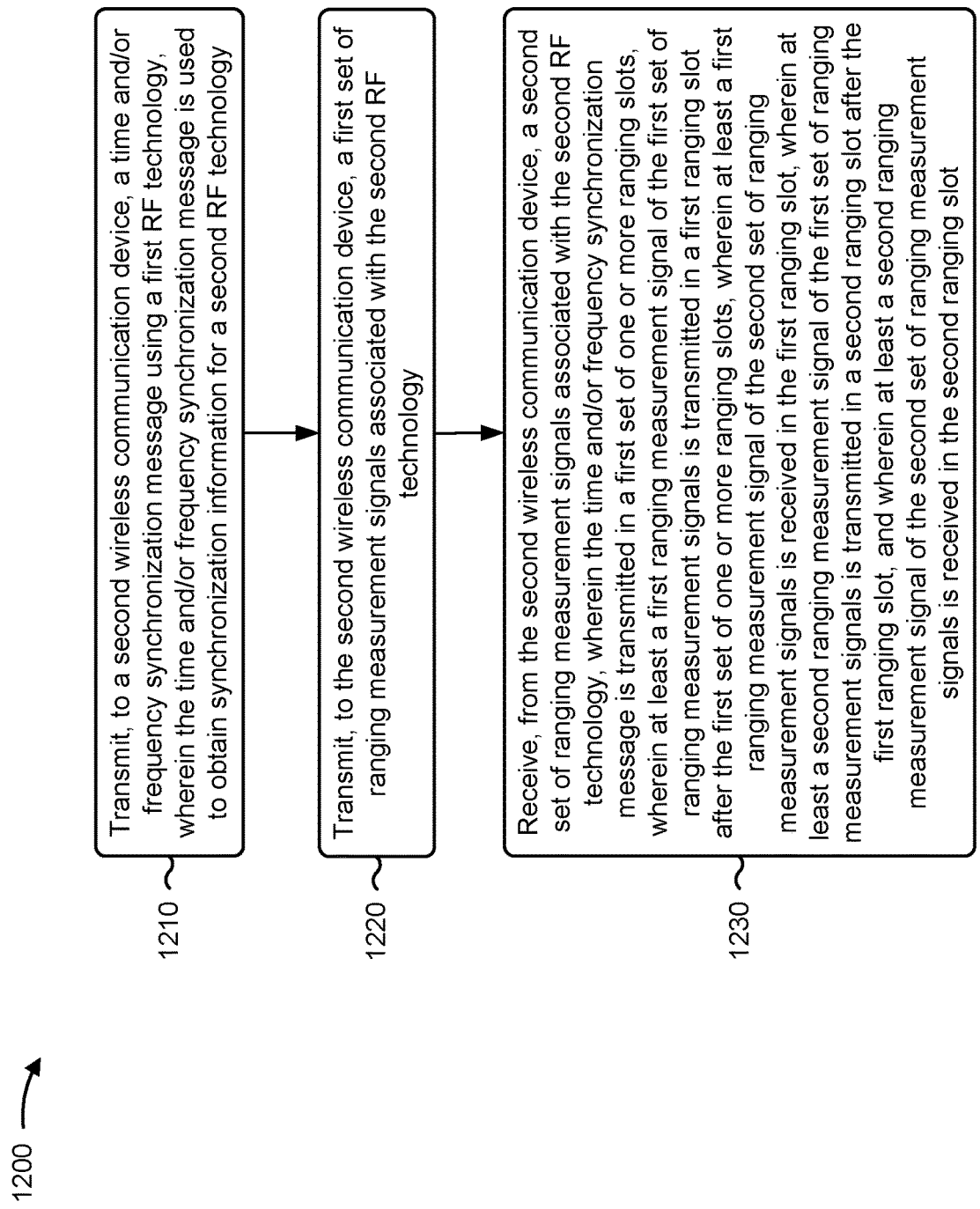
FIG. 12 is a diagram illustrating an example process performed, for example, by a first wireless communication device, in accordance with the present disclosure.

FIG. 12 is a diagram illustrating an example process 1200 performed, for example, by a first wireless communication device, in accordance with the present disclosure. Example process 1200 is an example where the first wireless communication device (e.g., UE 120) performs operations associated with narrowband assisted ultrawideband message sequences.

As shown in FIG. 12, in some aspects, process 1200 may include transmitting, to a second wireless communication device, a time and/or frequency synchronization message using a first RF technology, wherein the time and/or frequency synchronization message is used to obtain synchronization information for a second RF technology (block 1210). For example, the first wireless communication device (e.g., using communication manager 1608, transmission component 1604, and/or NB component 1614, depicted in FIG. 16) may perform the operation of block 1210, as described above.

As further shown in FIG. 12, in some aspects, process 1200 may include transmitting, to the second wireless communication device, a first set of ranging measurement signals associated with the second RF technology (block 1220). For example, the first wireless communication device (e.g., using communication manager 1608, TWR component 1610, and/or UWB component 1612, depicted in FIG. 16) may perform the operation of block 1220, as described above.

As further shown in FIG. 12, in some aspects, process 1200 may include receiving, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot (block 1230). For example, the first wireless communication device (e.g., using communication manager 1608, TWR component 1610, and/or UWB component 1612, depicted in FIG. 16) may perform the operation of block 1230, as described above Process 1200 may include additional aspects, such as any single aspect or any combination of aspects described below and/or in connection with one or more other processes described elsewhere herein.

In a first aspect, the first wireless communication device is an initiator device, and the second wireless communication device is a responder device.

In a second aspect, alone or in combination with the first aspect, the first RF technology is a narrowband technology, and the second RF technology is an ultrawideband technology.

In a third aspect, alone or in combination with one or more of the first and second aspects, process 1200 includes transmitting, to the second wireless communication device, multiple ranging measurement signals over multiple milliseconds.

In a fourth aspect, alone or in combination with one or more of the first through third aspects, the first set of ranging measurement signals are interleaved with the second set of ranging measurement signals so that the first ranging measurement signal of the second set of ranging measurement signals is received from the second wireless communication device after the first wireless communication device transmits the first ranging measurement signal of the first set of ranging measurement signals and prior to the first wireless communication device transmitting the second ranging measurement signal of the first set of ranging measurement signals, and so that the second ranging measurement signal of the second set of ranging measurement signals is received from the second wireless communication device after the first wireless communication device transmits the second ranging measurement signal of the first set of ranging measurement signals.

In a fifth aspect, alone or in combination with one or more of the first through fourth aspects, process 1200 includes receiving, from the second wireless communication device, a response message using the first RF technology, wherein the response message is received after transmitting the time and/or frequency synchronization message and prior to transmitting the first ranging measurement signal of the first set of ranging measurement signals.

In a sixth aspect, alone or in combination with one or more of the first through fifth aspects, the response message is received in the first set of one or more ranging slots.

In a seventh aspect, alone or in combination with one or more of the first through sixth aspects, the response message includes an early termination request from the second wireless communication device.

In an eighth aspect, alone or in combination with one or more of the first through seventh aspects, the early termination request indicates that a two-way ranging process should be terminated after a number of transmitted ranging measurement signals.

In a ninth aspect, alone or in combination with one or more of the first through eighth aspects, the number of transmitted ranging measurement signals is based at least in part on a received power measurement associated with the time and/or frequency synchronization message.

In a tenth aspect, alone or in combination with one or more of the first through ninth aspects, process 1200 includes receiving, from the second wireless communication device, an early termination request via one or more ranging measurement signals of the second set of ranging measurement signals.

In an eleventh aspect, alone or in combination with one or more of the first through tenth aspects, the early termination request is based at least in part on a received power measurement associated with the first set of ranging measurement signals.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
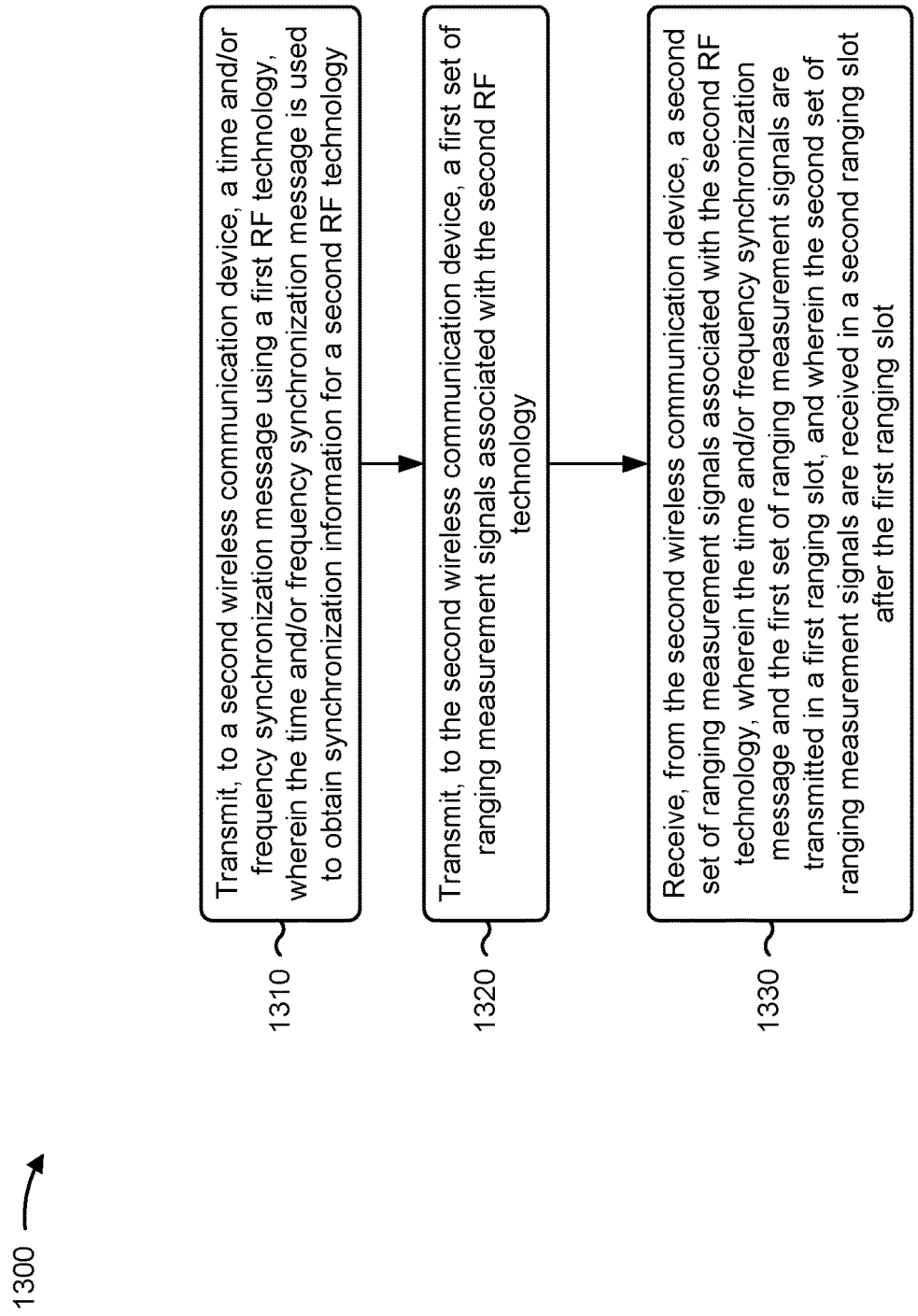
FIG. 13 is a diagram illustrating an example process performed, for example, by a first wireless communication device, in accordance with the present disclosure.

FIG. 13 is a diagram illustrating an example process 1300 performed, for example, by a first wireless communication device, in accordance with the present disclosure. Example process 1300 is an example where the first wireless communication device (e.g., a UE 120) performs operations associated with narrowband assisted ultrawideband message sequences.

As shown in FIG. 13, in some aspects, process 1300 may include transmitting, to a second wireless communication device, a time and/or frequency synchronization message is used to obtain synchronization information for a second RF technology (block 1310). For example, the first wireless communication device (e.g., using communication manager 1708, transmission component 1704, and/or NB component 1714, depicted in FIG. 14) may perform the operation of block 1310, as described above.

As further shown in FIG. 13, in some aspects, process 1300 may include transmitting, to the second wireless communication device, a first set of ranging measurement signals associated with the second RF technology (block 1320). For example, the first wireless communication device (e.g., using communication manager 1708, TWR component 1710, and/or UWB component 1712, depicted in FIG. 17) may perform the operation of block 1320, as described above.

As further shown in FIG. 13, in some aspects, process 1300 may include receiving, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot (block 1330). For example, the first wireless communication device (e.g., using communication manager 1708, TWR component 1710, and/or UWB component 1712, depicted in FIG. 17) may perform the operation of block 1330, as described above.

Process 1300 may include additional aspects, such as any single aspect or any combination of aspects described below and/or in connection with one or more other processes described elsewhere herein.

In a first aspect, the first wireless communication device is an initiator device, and the second wireless communication device is a responder device.

In a second aspect, alone or in combination with the first aspect, the first RF technology is a narrowband technology, and the second RF technology is an ultrawideband technology.

In a third aspect, alone or in combination with one or more of the first and second aspects, process 1300 includes transmitting, to the second wireless communication device, multiple ranging measurement signals over multiple milliseconds.

In a fourth aspect, alone or in combination with one or more of the first through third aspects, process 1300 includes receiving, from the second wireless communication device, a response message using the first RF technology, wherein the response message is received after transmitting the first set of ranging measurement signals and prior to receiving the second set of ranging measurement signals.

In a fifth aspect, alone or in combination with one or more of the first through fourth aspects, the response message is received in the second ranging slot.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
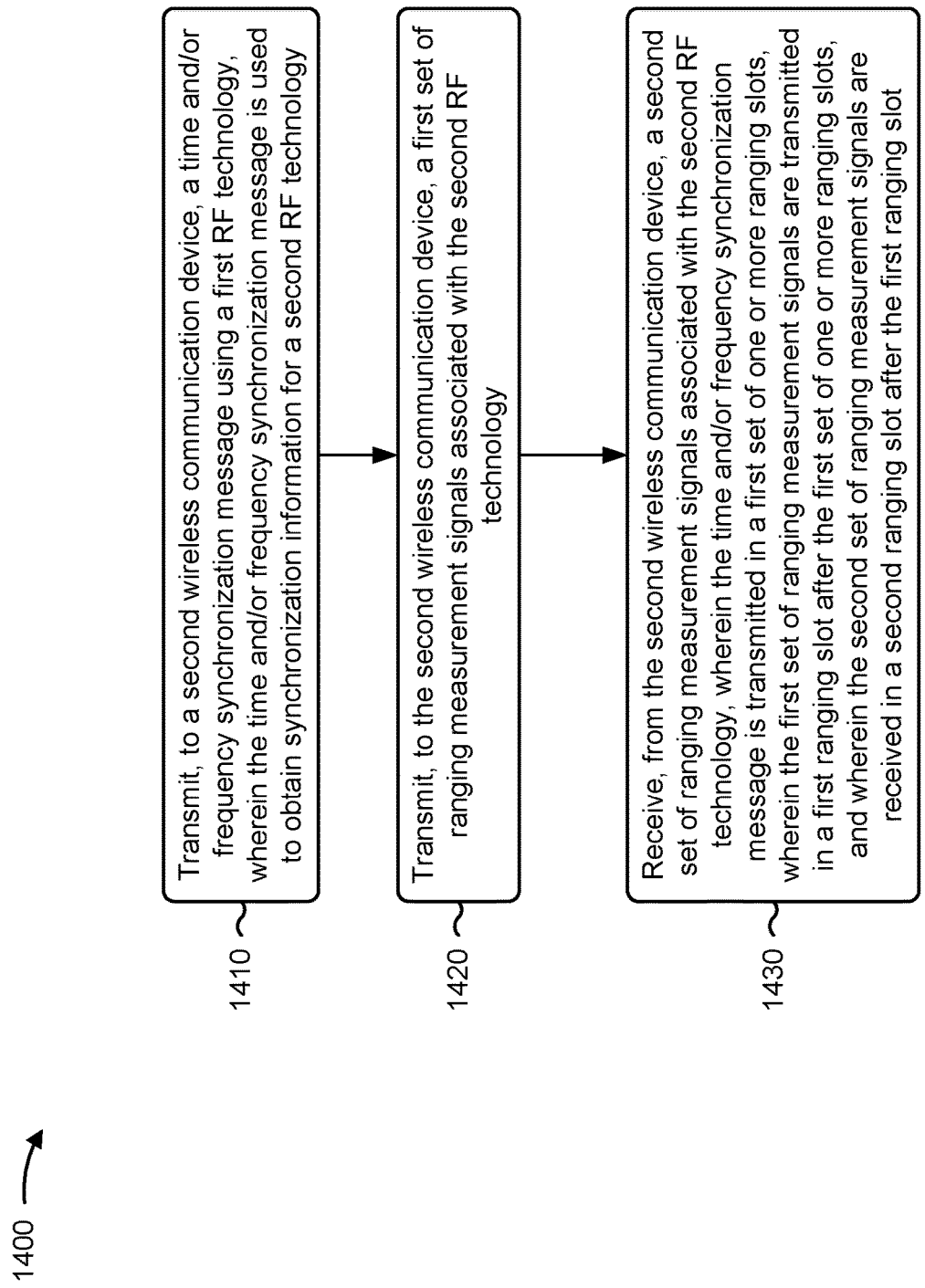
FIG. 14 is a diagram illustrating an example process performed, for example, by a first wireless communication device, in accordance with the present disclosure.

FIG. 14 is a diagram illustrating an example process 1400 performed, for example, by a first wireless communication device, in accordance with the present disclosure. Example process 1400 is an example where the first wireless communication device (e.g., a UE 120) performs operations associated with narrowband assisted ultrawideband message sequences.

As shown in FIG. 14, in some aspects, process 1400 may include transmitting, to a second wireless communication device, a time and/or frequency synchronization message using a first RF technology, wherein the time and/or frequency synchronization message is used to obtain synchronization information for a second RF technology (block 1410). For example, the first wireless communication device (e.g., using communication manager 1808, transmission component 1804, and/or NB component 1814, depicted in FIG. 18) may perform the operation of block 1410, as described above.

As further shown in FIG. 14, in some aspects, process 1400 may include transmitting, to the second wireless communication device, a first set of ranging measurement signals associated with the second RF technology (block 1420). For example, the first wireless communication device (e.g., using communication manager 1808, TWR component 1810, and/or UWB component 1812, depicted in FIG. 18) may perform the operation of block 1420, as described above.

As further shown in FIG. 14, in some aspects, process 1400 may include receiving, from the second wireless communication device, a second set of ranging measurement signals associated with the second RF technology, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot (block 1430). For example, the first wireless communication device (e.g., using communication manager 1808, TWR component 1810, and/or UWB component 1812, depicted in FIG. 18) may perform the operation of block 1430, as described above.

Process 1400 may include additional aspects, such as any single aspect or any combination of aspects described below and/or in connection with one or more other processes described elsewhere herein.

In a first aspect, the first wireless communication device is an initiator device, and the second wireless communication device is a responder device.

In a second aspect, alone or in combination with the first aspect, the first RF technology is a narrowband technology, and the second RF technology is an ultrawideband technology.

In a third aspect, alone or in combination with one or more of the first and second aspects, process 1400 includes transmitting, to the second wireless communication device, multiple ranging measurement signals over multiple milliseconds.

In a fourth aspect, alone or in combination with one or more of the first through third aspects, process 1400 includes receiving, from the second wireless communication device, a response message using the first RF technology, wherein the response message is received after transmitting the first set of ranging measurement signals and prior to receiving the second set of ranging measurement signals.

In a fifth aspect, alone or in combination with one or more of the first through fourth aspects, the response message is received in a second set of one or more ranging slots between the first ranging slot and the second ranging slot.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
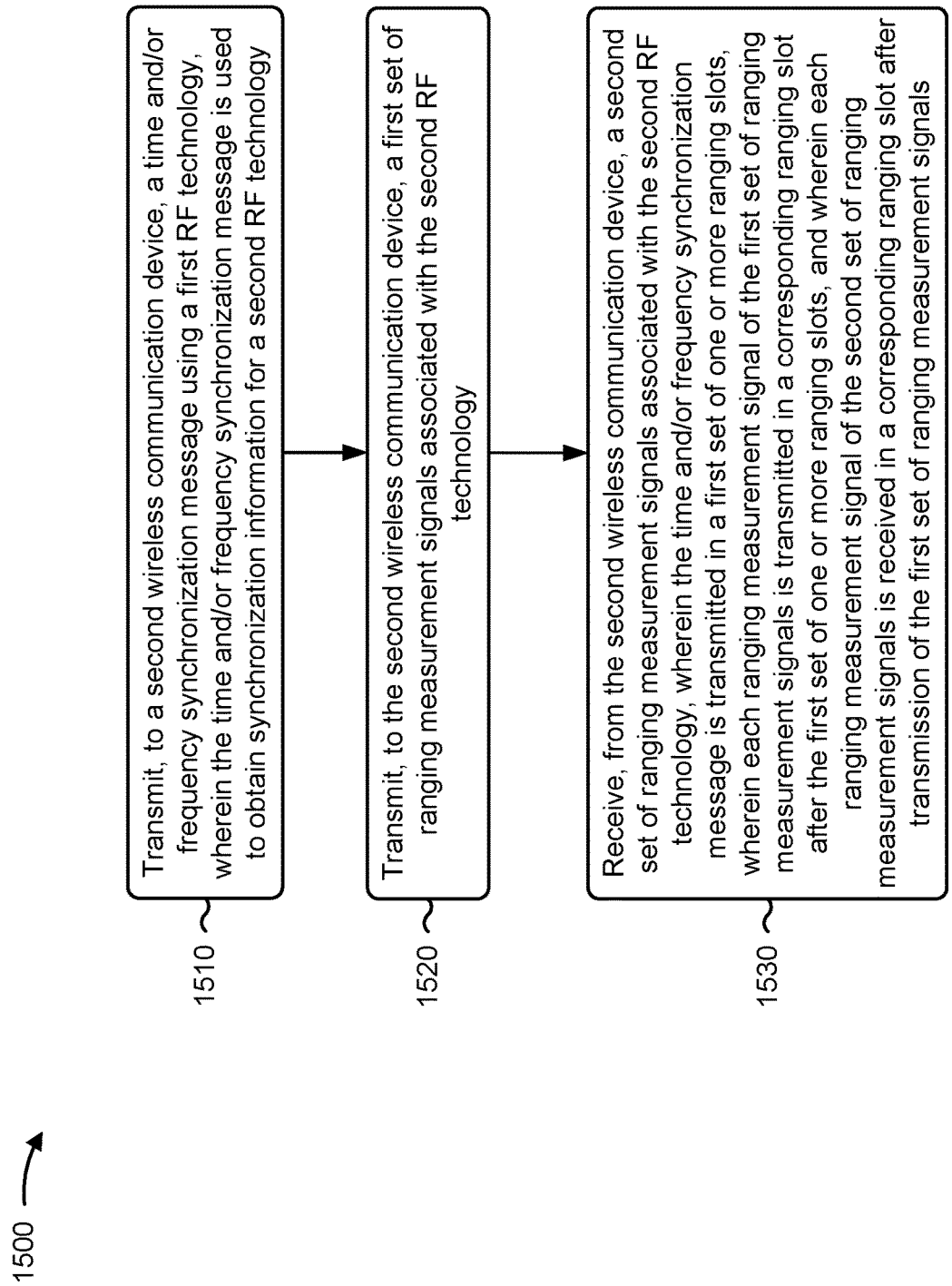
FIG. 15 is a diagram illustrating an example process performed, for example, by a first wireless communication device, in accordance with the present disclosure.

FIG. 15 is a diagram illustrating an example process 1500 performed, for example, by a first wireless communication device, in accordance with the present disclosure. Example process 1500 is an example where the first wireless communication device (e.g., a UE 120) performs operations associated with narrowband assisted ultrawideband message sequences.

As shown in FIG. 15, in some aspects, process 1500 may include transmitting, to a second wireless communication device, a time and/or frequency synchronization message is used to obtain synchronization information for a second RF technology (block 1510). For example, the first wireless communication device (e.g., using communication manager 1908, transmission component 1904, and/or NB component 1914, depicted in FIG. 19) may perform the operation of block 1510, as described above.

As further shown in FIG. 15, in some aspects, process 1500 may include transmitting, to the second wireless communication device, a first set of ranging measurement signals associated with the second RF technology (block 1520). For example, the first wireless communication device (e.g., using communication manager 1908, TWR component 1910, and/or UWB component 1912, depicted in FIG. 19) may perform the operation of block 1520, as described above.

As further shown in FIG. 15, in some aspects, process 1500 may include receiving, from the second wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals (block 1530). For example, the first wireless communication device (e.g., using communication manager 1908, TWR component 1910, and/or UWB component 1912, depicted in FIG. 19) may perform the operation of block 1530, as described above.

Process 1500 may include additional aspects, such as any single aspect or any combination of aspects described below and/or in connection with one or more other processes described elsewhere herein.

In a first aspect, the first wireless communication device is an initiator device, and the second wireless communication device is a responder device.

In a second aspect, alone or in combination with the first aspect, the first RF technology is a narrowband technology, and the second RF technology is an ultrawideband technology.

In a third aspect, alone or in combination with one or more of the first and second aspects, process 1500 includes transmitting, to the second wireless communication device, multiple ranging measurement signals over multiple milliseconds.

In a fourth aspect, alone or in combination with one or more of the first through third aspects, process 1500 includes receiving, from the second wireless communication device, a response message using the first RF technology, wherein the response message is received after transmitting the first set of ranging measurement signals and prior to receiving the second set of ranging measurement signals.

In a fifth aspect, alone or in combination with one or more of the first through fourth aspects, the response message is received in a second set of one or more ranging slots between transmission of the first set of ranging measurement signals and reception of the second set of ranging measurement signals.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
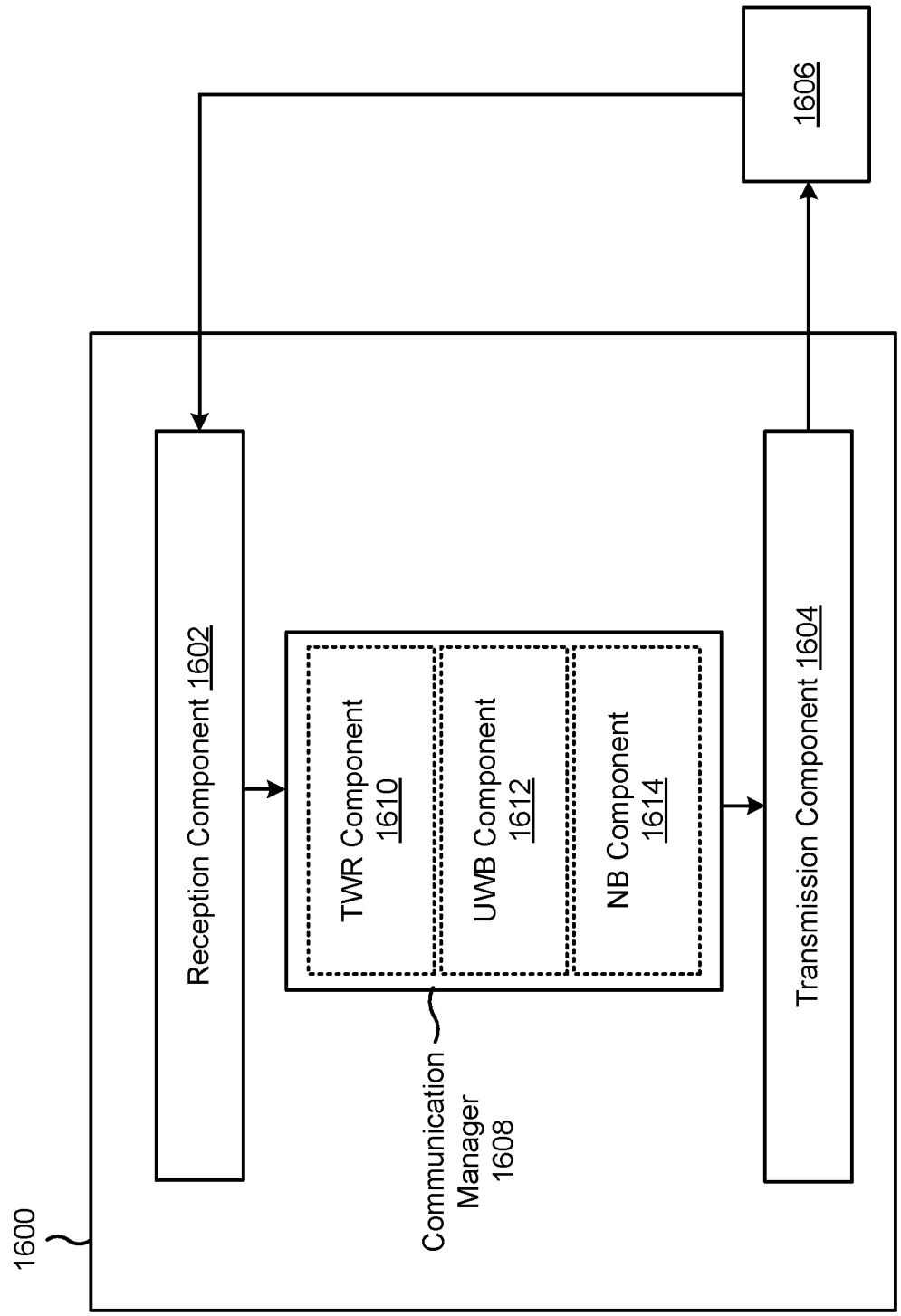
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a first wireless communication device (e.g., a UE 120, a UWB device, or the like), or a first wireless communication device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE 120, a base station 110, or another wireless communication device) using the reception component 1602 and the transmission component 1604. As further shown, the apparatus 1600 may include the communication manager 1608. The communication manager 1608 may include one or more of a TWR component 1610, a UWB component 1612, or an NB component 1614, among other examples.

In some aspects, the apparatus 1600 may be configured to perform one or more operations described herein in connection with FIGS. 5-11. Additionally, or alternatively, the apparatus 1600 may be configured to perform one or more processes described herein, such as process 1200 of FIG. 12. In some aspects, the apparatus 1600 and/or one or more components shown in FIG. 16 may include one or more components of the UE 120 described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE 120 described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE 120 described in connection with FIG. 2. In some aspects, the transmission component 1604 may be co-located with the reception component 1602 in a transceiver.

The transmission component 1604, the TWR component 1610, and/or the NB component 1614 may transmit, to a second wireless communication device, a time and/or frequency synchronization message using a first RF technology, wherein the time and/or frequency synchronization message is used to obtain synchronization information for a second RF technology. The transmission component 1604, the TWR component 1610, and/or the UWB component 1612 may transmit, to the second wireless communication device, a first set of ranging measurement signals associated with the second RF technology. The reception component 1602, the TWR component 1610, and/or the UWB component 1612 may receive, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

The transmission component 1604, the TWR component 1610, and/or the UWB component 1612 may transmit, to the second wireless communication device, multiple ranging measurement signals over multiple milliseconds.

The reception component 1602, the TWR component 1610, and/or the NB component 1614 may receive, from the second wireless communication device, a response message using the first RF technology, wherein the response message is received after transmitting the time and/or frequency synchronization message and prior to transmitting the first ranging measurement signal of the first set of ranging measurement signals.

The reception component 1602, the TWR component 1610, and/or the UWB component 1612 may receive, from the second wireless communication device, an early termination request via one or more ranging measurement signals of the second set of ranging measurement signals.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
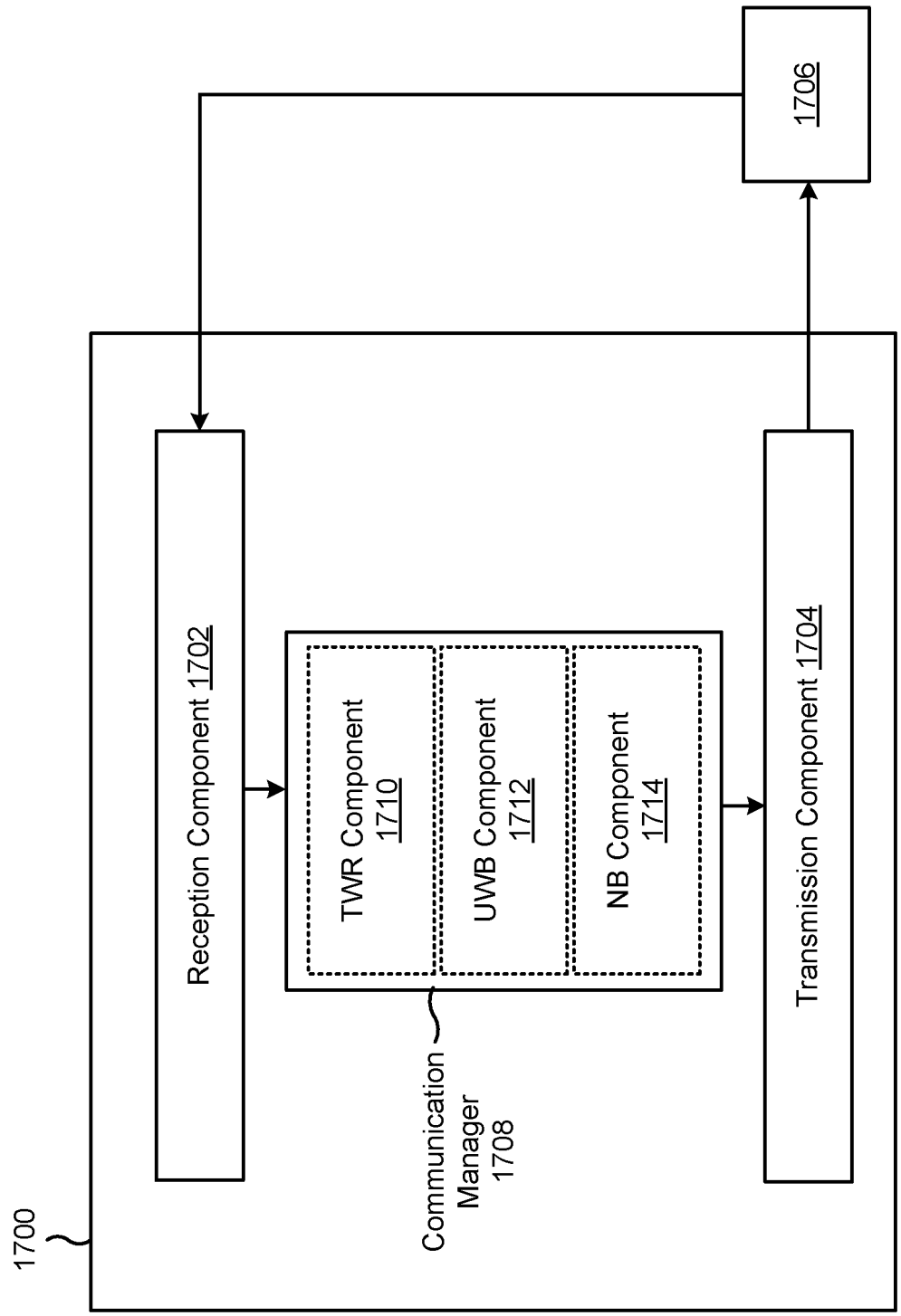
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a first wireless communication device (e.g., a UE 120, a UWB device, or the like), or a first wireless communication device may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE 120, a base station 110, or another wireless communication device) using the reception component 1702 and the transmission component 1704. As further shown, the apparatus 1700 may include the communication manager 1708. The communication manager 1708 may include one or more of a TWR component 1710, a UWB component 1712, or an NB component 1714, among other examples.

In some aspects, the apparatus 1700 may be configured to perform one or more operations described herein in connection with FIGS. 5-11. Additionally, or alternatively, the apparatus 1700 may be configured to perform one or more processes described herein, such as process 1300 of FIG. 13. In some aspects, the apparatus 1700 and/or one or more components shown in FIG. 17 may include one or more components of the UE 120 described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE 120 described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE 120 described in connection with FIG. 2. In some aspects, the transmission component 1704 may be co-located with the reception component 1702 in a transceiver.

The transmission component 1704, the TWR component 1710, and/or the NB component 1714 may transmit, to a second wireless communication device, a time and/or frequency synchronization message using a first RF technology, wherein the time and/or frequency synchronization message is used to obtain synchronization information for a second RF technology. The transmission component 1704, the TWR component, and/or the UWB component 1712 may transmit, to the second wireless communication device, a first set of ranging measurement signals associated with the second RF technology. The reception component 1702, the TWR component, and/or the UWB component 1712 may receive, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

The transmission component 1704, the TWR component 1710, and/or the UWB component 1712 may transmit, to the second wireless communication device, multiple ranging measurement signals over multiple milliseconds.

The reception component 1702, the TWR component, and/or the NB component 1714 may receive, from the second wireless communication device, a response message using the first RF technology, wherein the response message is received after transmitting the first set of ranging measurement signals and prior to receiving the second set of ranging measurement signals.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
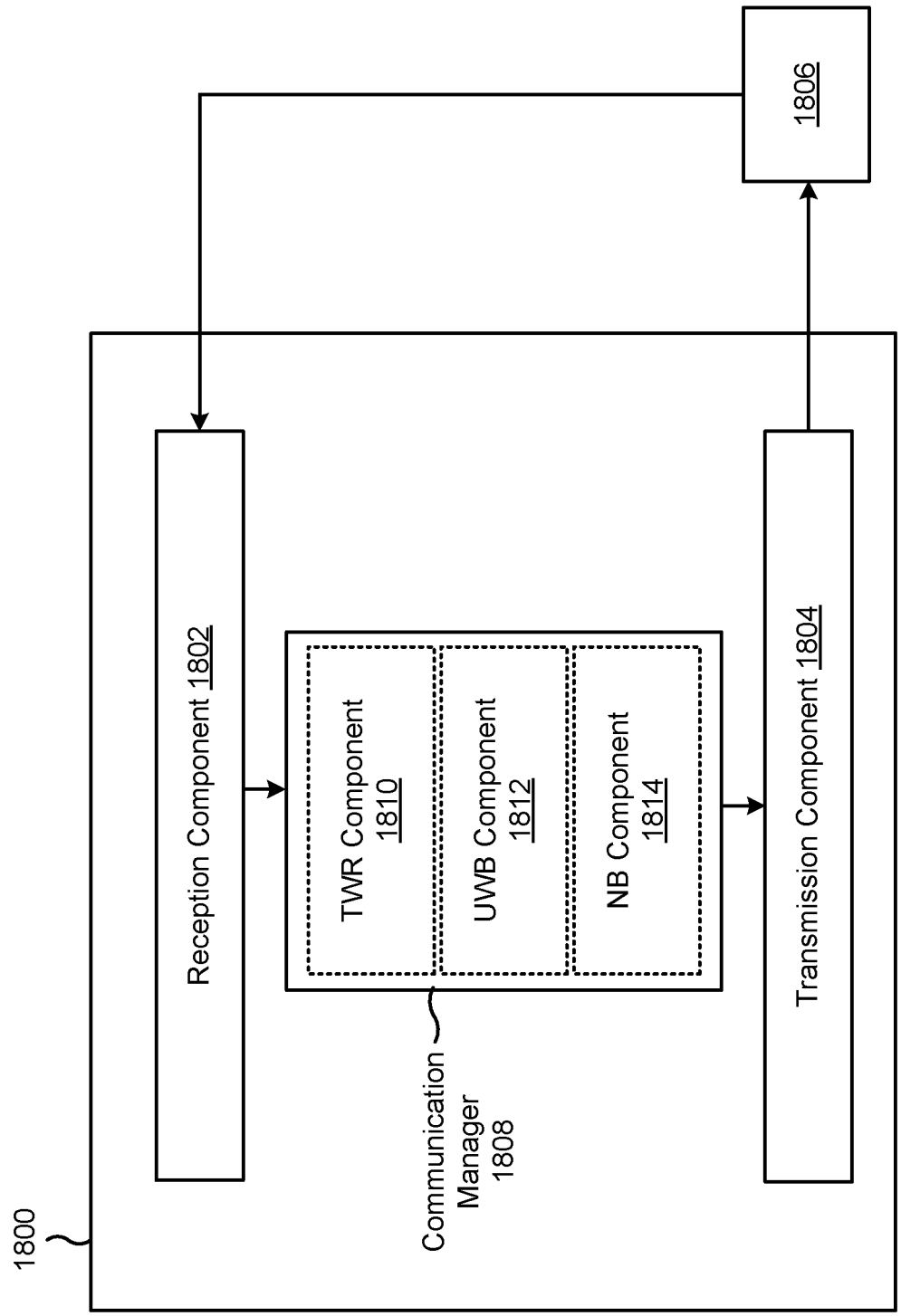
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a first wireless communication device (e.g., a UE 120, a UWB device, or the like), or a first wireless communication device may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE 120, a base station 110, or another wireless communication device) using the reception component 1802 and the transmission component 1804. As further shown, the apparatus 1800 may include the communication manager 1808. The communication manager 1808 may include one or more of a TWR component 1810, a UWB component 1812, or an NB component 1814, among other examples.

In some aspects, the apparatus 1800 may be configured to perform one or more operations described herein in connection with FIGS. 5-11. Additionally, or alternatively, the apparatus 1800 may be configured to perform one or more processes described herein, such as process 1400 of FIG. 14. In some aspects, the apparatus 1800 and/or one or more components shown in FIG. 18 may include one or more components of the UE 120 described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the UE 120 described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the UE 120 described in connection with FIG. 2. In some aspects, the transmission component 1804 may be co-located with the reception component 1802 in a transceiver.

The transmission component 1804, the TWR component 1810, and/or the NB component 1814 may transmit, to a second wireless communication device, a time and/or frequency synchronization message using a first RF technology, wherein the time and/or frequency synchronization message is used to obtain synchronization information for a second RF technology. The transmission component 1804, the TWR component 1810, and/or the UWB component 1812 may transmit, to the second wireless communication device, a first set of ranging measurement signals associated with the second RF technology. The reception component 1802, the TWR component 1810, and/or the UWB component 1812 may receive, from the second wireless communication device, a second set of ranging measurement signals wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

The transmission component 1804, the TWR component 1810, and/or the UWB component 1812 may transmit, to the second wireless communication device, multiple ranging measurement signals over multiple milliseconds.

The reception component 1802, the TWR component 1810, and/or the NB component 1814 may receive, from the second wireless communication device, a response message using the first RF technology, wherein the response message is received after transmitting the first set of ranging measurement signals and prior to receiving the second set of ranging measurement signals.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
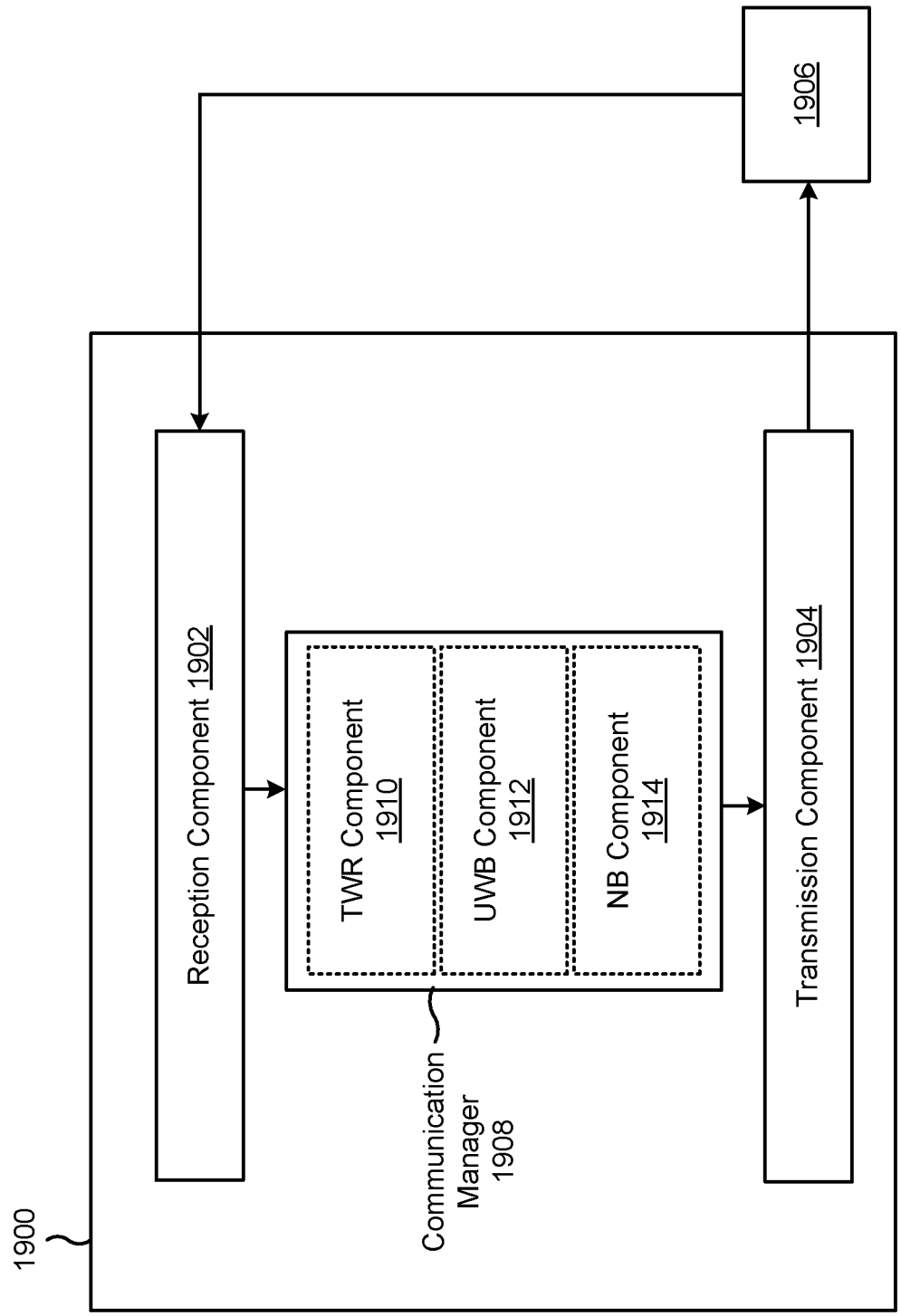
FIG. 19 is a diagram of an example apparatus for wireless communication, in accordance with the present disclosure.

FIG. 19 is a diagram of an example apparatus 1900 for wireless communication, in accordance with the present disclosure. The apparatus 1900 may be a first wireless communication device (e.g., a UE 120, a UWB device, or the like), or a first wireless communication device may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE 120, a base station 110, or another wireless communication device) using the reception component 1902 and the transmission component 1904. As further shown, the apparatus 1900 may include the communication manager 1908. The communication manager 1908 may include one or more of a TWR component 1910, a UWB component 1912, or an NB component 1914, among other examples.

In some aspects, the apparatus 1900 may be configured to perform one or more operations described herein in connection with FIGS. 5-11. Additionally, or alternatively, the apparatus 1900 may be configured to perform one or more processes described herein, such as process 1500 of FIG. 15. In some aspects, the apparatus 1900 and/or one or more components shown in FIG. 19 may include one or more components of the UE 120 described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the UE 120 described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modem, a modulator, a transmit MIMO processor, a transmit processor, a controller/processor, a memory, or a combination thereof, of the UE 120 described in connection with FIG. 2. In some aspects, the transmission component 1904 may be co-located with the reception component 1902 in a transceiver.

The transmission component 1904, the TWR component 1910, and/or the NB component 1914 may transmit, to a second wireless communication device, a time and/or frequency synchronization message using a first RF technology, wherein the time and/or frequency synchronization message is used to obtain synchronization information for a second RF technology. The transmission component 1904, the TWR component 1910, and/or the UWB component 1912 may transmit, to the second wireless communication device, a first set of ranging measurement signals associated with the second RF technology. The reception component 1902, the TWR component 1910, and/or the UWB component 1912 may receive, from the second wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals.

The transmission component 1904, the TWR component 1910, and/or the UWB component 1912 may transmit, to the second wireless communication device, multiple ranging measurement signals over multiple milliseconds.

The reception component 1902, the TWR component 1910, and/or the NB component 1914 may receive, from the second wireless communication device, a response message using the first RF technology, wherein the response message is received after transmitting the first set of ranging measurement signals and prior to receiving the second set of ranging measurement signals.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of some Aspects of the present disclosure:

Aspect 1: A method of wireless communication performed by a first wireless communication device, comprising: transmitting, to a second wireless communication device, a time and/or frequency synchronization message using a first RF technology, wherein the time and/or frequency synchronization message is used to obtain synchronization information for a second RF technology; and performing, with the second wireless communication device, a two-way ranging process by transmitting and receiving ranging measurement signals associated with the second RF technology based at least in part on the synchronization information, wherein performing the two-way ranging process includes transmitting, to the second wireless communication device, a first set of ranging measurement signals and receiving, from the second wireless communication device, a second set of ranging measurement signals based at least in part on a ranging measurement signal transmission sequence.

Aspect 2: The method of Aspect 1, wherein the first wireless communication device is an initiator device, and the second wireless communication device is a responder device.

Aspect 3: The method of any of Aspects 1-2, wherein the first RF technology is a narrowband technology, and wherein the second RF technology is an ultrawideband technology.

Aspect 4: The method of Aspect 3, wherein the narrowband technology is associated with one of Bluetooth, Bluetooth Low Energy, a WLAN, or an offset quadrature phase shift keying technology.

Aspect 5: The method of any of Aspects 1-4, further comprising transmitting, to the second wireless communication device, multiple ranging measurement signals over multiple milliseconds.

Aspect 6: The method of any of Aspects 1-5, wherein the ranging measurement signal transmission sequence is configured such that the first wireless communication device receives, from the second wireless communication device, the second set of ranging measurement signals after the first wireless communication device transmits the first set of ranging measurement signals.

Aspect 7: The method of Aspect 6, further comprising receiving, from the second wireless communication device, a response message using the first RF technology, wherein the response message is received after transmitting the first set of ranging measurement signals and prior to receiving the second set of ranging measurement signals.

Aspect 8: The method of Aspect 7, wherein the response message provides at least one of: a first RF technology signal to obtain synchronization information for the second RF technology, a measurement report associated with the first set of ranging measurement signals, information associated with two-way hand shaking between the first wireless communication device and the second wireless communication device, or a frequency correction performed by the second wireless communication device.

Aspect 9: The method of any of Aspects 1-5, wherein the ranging measurement signal transmission sequence is configured such that the first set of ranging measurement signals are interleaved with the second set of ranging measurement signals so that a first ranging measurement signal associated with the second set of ranging measurement signals is transmitted by the second wireless communication device after the first wireless communication device transmits a first ranging measurement signal associated with the first set of ranging measurement signals and prior to the first wireless communication device transmitting a second ranging measurement signal associated with the first set of ranging measurement signals, and so that a second ranging measurement signal associated with the second set of ranging measurement signals is transmitted by the second wireless communication device after the first wireless communication device transmits the second ranging measurement signal associated with the first set of ranging measurement signals.

Aspect 10: The method of Aspect 9, further comprising receiving, from the second wireless communication device, a response message using the first RF technology.

Aspect 11: The method of Aspect 10, wherein the response message is received after transmitting the time and/or frequency synchronization message and prior to transmitting the first ranging measurement signal.

Aspect 12: The method of any of Aspects 10-11, wherein the response message provides at least one of: a first RF technology signal to obtain synchronization information for the second RF technology, information associated with two-way hand shaking between the first wireless communication device and the second wireless communication device, or a frequency correction performed by the second wireless communication device.

Aspect 13: The method of any of Aspects 10-12, wherein the response message includes an early termination request from the second wireless communication device.

Aspect 14: The method of Aspect 13, wherein the early termination request indicates that the two-way ranging process should be terminated after a number of transmitted ranging measurement signals.

Aspect 15: The method of Aspect 14, wherein the number of transmitted ranging measurement signals is based at least in part on a received power measurement associated with the time and/or frequency synchronization message.

Aspect 16: The method of any of Aspects 9-15, further comprising receiving, from the second wireless communication device, an early termination request via one or more ranging measurement signals associated with the second set of ranging measurement signals.

Aspect 17: The method of Aspect 16, wherein the early termination request is based at least in part on a received power measurement associated with the first set of ranging measurement signals.

Aspect 18: The method of any of Aspects 1-17, wherein the two-way ranging process is associated with a ranging session established via a narrowband RF technology.

Aspect 19: The method of any of Aspects 1-18, wherein the time and/or frequency synchronization message and the first set of ranging measurement signals are transmitted in a first ranging slot, and wherein the second set of ranging measurement signals are received in a second ranging slot following the first ranging slot.

Aspect 20: The method of Aspect 19, further comprising receiving, from the second wireless communication device, a response message using the first RF technology, wherein the response message is received in the second ranging slot.

Aspect 21: The method of any of Aspects 1-20, wherein the time and/or frequency synchronization message is transmitted in a first set of one or more ranging slots, wherein the first set of ranging measurement signals are transmitted in a first ranging slot following the first set of one or more ranging slots, and wherein the second set of ranging measurement signals are received in a second ranging slot following the first ranging slot.

Aspect 22: The method of Aspect 21, further comprising receiving, from the second wireless communication device, a response message using the first RF technology, wherein the response message is received in a second set of one or more ranging slots between the first ranging slot and the second ranging slot.

Aspect 23: The method of any of Aspects 1-22, wherein the time and/or frequency synchronization message is transmitted in a first set of one or more ranging slots, wherein each ranging measurement signal of the first set of ranging measurement signals is transmitted in a corresponding ranging slot following the first set of one or more ranging slots, and wherein each ranging measurement signal of the second set of ranging measurement signals is received in a corresponding ranging slot following transmission of the first set of ranging measurement signals.

Aspect 24: The method of Aspect 23, further comprising receiving, from the second wireless communication device, a response message using the first RF technology, wherein the response message is received in a second set of one or more ranging slots between transmission of the first set of ranging measurement signals and reception of the second set of ranging measurement signals.

Aspect 25: The method of any of Aspects 1-24, wherein the time and/or frequency synchronization message is transmitted in a first set of one or more ranging slots, wherein at least a first ranging measurement signal associated with the first set of ranging measurement signals is transmitted in a first ranging slot following the first set of one or more ranging slots, wherein at least a first ranging measurement signal associated with the second set of ranging measurement signals is received in the first ranging slot, wherein at least a second ranging measurement signal associated with the first set of ranging measurement signals is transmitted in a second ranging slot following the first ranging slot, and wherein at least a second transmitted ranging measurement signal associated with the second set of ranging measurement signals is received in the second ranging slot.

Aspect 26: The method of Aspect 25, further comprising receiving, from the second wireless communication device, a response message using the first RF technology, wherein the response message is received in the first set of one or more ranging slots.

Aspect 27: The method of any of Aspects 25-26, further comprising receiving, from the second wireless communication device, a report message associated with a measurement report using the first RF technology, wherein the report message is received in a second set of one or more ranging slots following transmission of the first set of ranging measurement signals and reception of the second set of ranging measurement signals.

Aspect 28: The method of Aspect 27, further comprising transmitting, to the second wireless communication device, an acknowledgement message based at least in part on receiving the measurement report.

Aspect 29: A method of wireless communication performed by a first wireless communication device, comprising: transmitting, to a second wireless communication device, a time and/or frequency synchronization message using a first RF technology, wherein the time and/or frequency synchronization message is used to obtain synchronization information for a second RF technology; transmitting, to the second wireless communication device, a first set of ranging measurement signals associated with the second RF technology; and receiving, from the second wireless communication device, a second set of ranging measurement signals associated with the second RF technology, wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

Aspect 30: The method of Aspect 29, wherein the first wireless communication device is an initiator device, and wherein the second wireless communication device is a responder device.

Aspect 31: The method of any of Aspects 29-30, wherein the first RF technology is a narrowband technology, and wherein the second RF technology is an ultrawideband technology.

Aspect 32: The method of any of Aspects 29-31, further comprising transmitting, to the second wireless communication device, multiple ranging measurement signals over multiple milliseconds.

Aspect 33: The method of any of Aspects 29-32, wherein the first set of ranging measurement signals are interleaved with the second set of ranging measurement signals so that the first ranging measurement signal of the second set of ranging measurement signals is received from the second wireless communication device after the first wireless communication device transmits the first ranging measurement signal of the first set of ranging measurement signals and prior to the first wireless communication device transmitting the second ranging measurement signal of the first set of ranging measurement signals, and so that the second ranging measurement signal of the second set of ranging measurement signals is received from the second wireless communication device after the first wireless communication device transmits the second ranging measurement signal of the first set of ranging measurement signals.

Aspect 34: The method of Aspect 33, further comprising receiving, from the second wireless communication device, a response message using the first RF technology, wherein the response message is received after transmitting the time and/or frequency synchronization message and prior to transmitting the first ranging measurement signal of the first set of ranging measurement signals.

Aspect 35: The method of Aspect 34, wherein the response message is received in the first set of one or more ranging slots.

Aspect 36: The method of any of Aspects 34-35, wherein the response message includes an early termination request from the second wireless communication device.

Aspect 37: The method of Aspect 36, wherein the early termination request indicates that a two-way ranging process should be terminated after a number of transmitted ranging measurement signals.

Aspect 38: The method of Aspect 37, wherein the number of transmitted ranging measurement signals is based at least in part on a received power measurement associated with the time and/or frequency synchronization message.

Aspect 39: The method of any of Aspects 33-38, further comprising receiving, from the second wireless communication device, an early termination request via one or more ranging measurement signals of the second set of ranging measurement signals.

Aspect 40: The method of Aspect 39, wherein the early termination request is based at least in part on a received power measurement associated with the first set of ranging measurement signals.

Aspect 41: A method of wireless communication performed by a first wireless communication device, comprising: transmitting, to a second wireless communication device, a time and/or frequency synchronization message using a RF technology, wherein the time and/or frequency synchronization message is used to obtain synchronization information for a second RF technology; transmitting, to the second wireless communication device, a first set of ranging measurement signals associated with the second RF technology; and receiving, from the second wireless communication device, a second set of ranging measurement signals associated with the second RF technology, wherein the time and/or frequency synchronization message and the first set of ranging measurement signals are transmitted in a first ranging slot, and wherein the second set of ranging measurement signals are received in a second ranging slot after the first ranging slot.

Aspect 42: The method of Aspect 41, wherein the first wireless communication device is an initiator device, and wherein the second wireless communication device is a responder device.

Aspect 43: The method of any of Aspects 41-42, wherein the first RF technology is a narrowband technology, and wherein the second RF technology is an ultrawideband technology.

Aspect 44: The method of any of Aspects 41-43, further comprising transmitting, to the second wireless communication device, multiple ranging measurement signals over multiple milliseconds.

Aspect 45: The method of any of Aspects 41-44, further comprising receiving, from the second wireless communication device, a response message using the first RF technology, wherein the response message is received after transmitting the first set of ranging measurement signals and prior to receiving the second set of ranging measurement signals.

Aspect 46: The method of Aspect 45, wherein the response message is received in the second ranging slot.

Aspect 47: A method of wireless communication performed by a first wireless communication device, comprising: transmitting, to a second wireless communication device, a time and/or frequency synchronization message using a first RF technology, wherein the time and/or frequency synchronization message is used to obtain synchronization information for a second RF technology; transmitting, to the second wireless communication device, a first set of ranging measurement signals associated with the second RF technology; and receiving, from the second wireless communication device, a second set of ranging measurement signals associated with the second RF technology, wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot.

Aspect 48: The method of Aspect 47, wherein the first wireless communication device is an initiator device, and wherein the second wireless communication device is a responder device.

Aspect 49: The method of any of Aspects 47-48, wherein the first RF technology is a narrowband technology, and wherein the second RF technology is an ultrawideband technology.

Aspect 50: The method of any of Aspects 47-49, further comprising transmitting, to the second wireless communication device, multiple ranging measurement signals over multiple milliseconds.

Aspect 51: The method of any of Aspects 47-50, further comprising receiving, from the second wireless communication device, a response message using the first RF technology, wherein the response message is received after transmitting the first set of ranging measurement signals and prior to receiving the second set of ranging measurement signals.

Aspect 52: The method of Aspect 51, wherein the response message is received in a second set of one or more ranging slots between the first ranging slot and the second ranging slot.

Aspect 53: A method of wireless communication performed by a first wireless communication device, comprising: transmitting, to a second wireless communication device, a time and/or frequency synchronization message using a first RF technology, wherein the time and/or frequency synchronization message is used to obtain synchronization information for a second RF technology; transmitting, to the second wireless communication device, a first set of ranging measurement signals associated with the second RF technology; and receiving, from the second wireless communication device, a second set of ranging measurement signals associated with the second RF technology, wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals.

Aspect 54: The method of Aspect 53, wherein the first wireless communication device is an initiator device, and wherein the second wireless communication device is a responder device.

Aspect 55: The method of any of Aspects 53-54, wherein the first RF technology is a narrowband technology, and wherein the second RF technology is an ultrawideband technology.

Aspect 56: The method of any of Aspects 53-55, further comprising transmitting, to the second wireless communication device, multiple ranging measurement signals over multiple milliseconds.

Aspect 57: The method of any of Aspects 53-56, further comprising receiving, from the second wireless communication device, a response message using the first RF technology, wherein the response message is received after transmitting the first set of ranging measurement signals and prior to receiving the second set of ranging measurement signals.

Aspect 58: The method of Aspect 57, wherein the response message is received in a second set of one or more ranging slots between transmission of the first set of ranging measurement signals and reception of the second set of ranging measurement signals.

Aspect 59: An apparatus for wireless communication at a device, comprising a processor; memory coupled with the processor; and instructions stored in the memory and executable by the processor to cause the apparatus to perform the method of one or more of Aspects 1-28.

Aspect 60: A device for wireless communication, comprising a memory and one or more processors coupled to the memory, the one or more processors configured to perform the method of one or more of Aspects 1-28.

Aspect 61: An apparatus for wireless communication, comprising at least one means for performing the method of one or more of Aspects 1-28.

Aspect 62: A non-transitory computer-readable medium storing code for wireless communication, the code comprising instructions executable by a processor to perform the method of one or more of Aspects 1-28.

Aspect 63: A non-transitory computer-readable medium storing a set of instructions for wireless communication, the set of instructions comprising one or more instructions that, when executed by one or more processors of a device, cause the device to perform the method of one or more of Aspects 1-28.

Aspect 64: An apparatus for wireless communication at a device, comprising a processor; memory coupled with the processor; and instructions stored in the memory and executable by the processor to cause the apparatus to perform the method of one or more of Aspects 29-40.

Aspect 65: A device for wireless communication, comprising a memory and one or more processors coupled to the memory, the one or more processors configured to perform the method of one or more of Aspects 29-40.

Aspect 66: An apparatus for wireless communication, comprising at least one means for performing the method of one or more of Aspects 29-40.

Aspect 67: A non-transitory computer-readable medium storing code for wireless communication, the code comprising instructions executable by a processor to perform the method of one or more of Aspects 29-40.

Aspect 68: A non-transitory computer-readable medium storing a set of instructions for wireless communication, the set of instructions comprising one or more instructions that, when executed by one or more processors of a device, cause the device to perform the method of one or more of Aspects 29-40.

Aspect 69: An apparatus for wireless communication at a device, comprising a processor; memory coupled with the processor; and instructions stored in the memory and executable by the processor to cause the apparatus to perform the method of one or more of Aspects 41-46.

Aspect 70: A device for wireless communication, comprising a memory and one or more processors coupled to the memory, the one or more processors configured to perform the method of one or more of Aspects 41-46.

Aspect 71: An apparatus for wireless communication, comprising at least one means for performing the method of one or more of Aspects 41-46.

Aspect 72: A non-transitory computer-readable medium storing code for wireless communication, the code comprising instructions executable by a processor to perform the method of one or more of Aspects 41-46.

Aspect 73: A non-transitory computer-readable medium storing a set of instructions for wireless communication, the set of instructions comprising one or more instructions that, when executed by one or more processors of a device, cause the device to perform the method of one or more of Aspects 41-46.

Aspect 74: An apparatus for wireless communication at a device, comprising a processor; memory coupled with the processor; and instructions stored in the memory and executable by the processor to cause the apparatus to perform the method of one or more of Aspects 47-52.

Aspect 75: A device for wireless communication, comprising a memory and one or more processors coupled to the memory, the one or more processors configured to perform the method of one or more of Aspects 47-52.

Aspect 76: An apparatus for wireless communication, comprising at least one means for performing the method of one or more of Aspects 47-52.

Aspect 77: A non-transitory computer-readable medium storing code for wireless communication, the code comprising instructions executable by a processor to perform the method of one or more of Aspects 47-52.

Aspect 78: A non-transitory computer-readable medium storing a set of instructions for wireless communication, the set of instructions comprising one or more instructions that, when executed by one or more processors of a device, cause the device to perform the method of one or more of Aspects 47-52.

Aspect 79: An apparatus for wireless communication at a device, comprising a processor; memory coupled with the processor; and instructions stored in the memory and executable by the processor to cause the apparatus to perform the method of one or more of Aspects 53-58.

Aspect 80: A device for wireless communication, comprising a memory and one or more processors coupled to the memory, the one or more processors configured to perform the method of one or more of Aspects 53-58.

Aspect 81: An apparatus for wireless communication, comprising at least one means for performing the method of one or more of Aspects 53-58.

Aspect 82: A non-transitory computer-readable medium storing code for wireless communication, the code comprising instructions executable by a processor to perform the method of one or more of Aspects 53-58.

Aspect 83: A non-transitory computer-readable medium storing a set of instructions for wireless communication, the set of instructions comprising one or more instructions that, when executed by one or more processors of a device, cause the device to perform the method of one or more of Aspects 53-58.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device, comprising:
a memory; and
one or more processors, coupled to the memory, configured to cause the first wireless communication device to:
transmit, to a second wireless communication device, a time and/or frequency synchronization message using a first radio frequency (RF) technology, wherein the time and/or frequency synchronization message is used to obtain synchronization information for a second RF technology;
transmit, to the second wireless communication device, a first set of ranging measurement signals associated with the second RF technology; and
receive, from the second wireless communication device, a second set of ranging measurement signals associated with the second RF technology,
wherein the time and/or frequency synchronization message is transmitted in a first set of one or more ranging slots, wherein at least a first ranging measurement signal of the first set of ranging measurement signals is transmitted in a first ranging slot after the first set of one or more ranging slots, wherein at least a first ranging measurement signal of the second set of ranging measurement signals is received in the first ranging slot, wherein at least a second ranging measurement signal of the first set of ranging measurement signals is transmitted in a second ranging slot after the first ranging slot, and wherein at least a second ranging measurement signal of the second set of ranging measurement signals is received in the second ranging slot.

2. The first wireless communication device of claim 1, wherein the first wireless communication device is an initiator device, and wherein the second wireless communication device is a responder device.

3. The first wireless communication device of claim 1, wherein the first RF technology is a narrowband technology, and wherein the second RF technology is an ultrawideband technology.

4. The first wireless communication device of claim 1, wherein the one or more processors are further configured to cause the first wireless communication device to transmit, to the second wireless communication device, multiple ranging measurement signals over multiple milliseconds.

5. The first wireless communication device of claim 1, wherein the first set of ranging measurement signals are interleaved with the second set of ranging measurement signals so that the first ranging measurement signal of the second set of ranging measurement signals is received from the second wireless communication device after the first wireless communication device transmits the first ranging measurement signal of the first set of ranging measurement signals and prior to the first wireless communication device transmitting the second ranging measurement signal of the first set of ranging measurement signals, and so that the second ranging measurement signal of the second set of ranging measurement signals is received from the second wireless communication device after the first wireless communication device transmits the second ranging measurement signal of the first set of ranging measurement signals.

6. The first wireless communication device of claim 5, wherein the one or more processors are further configured to cause the first wireless communication device to receive, from the second wireless communication device, a response message using the first RF technology, wherein the response message is received after transmitting the time and/or frequency synchronization message and prior to transmitting the first ranging measurement signal of the first set of ranging measurement signals.

7. The first wireless communication device of claim 6, wherein the response message is received in the first set of one or more ranging slots.

8. The first wireless communication device of claim 6, wherein the response message includes an early termination request from the second wireless communication device.

9. The first wireless communication device of claim 8, wherein the early termination request indicates that a two-way ranging process should be terminated after a number of transmitted ranging measurement signals.

10. The first wireless communication device of claim 9, wherein the number of transmitted ranging measurement signals is based at least in part on a received power measurement associated with the time and/or frequency synchronization message.

11. The first wireless communication device of claim 1, wherein the one or more processors are further configured to cause the first wireless communication device to receive, from the second wireless communication device, an early termination request via one or more ranging measurement signals of the second set of ranging measurement signals.

12. The first wireless communication device of claim 11, wherein the early termination request is based at least in part on a received power measurement associated with the first set of ranging measurement signals.

13. A first wireless communication device, comprising:
a memory; and one or more processors, coupled to the memory, configured to cause the first wireless communication device to:
transmit, to a second wireless communication device, a time and/or frequency synchronization message using a first radio frequency (RF) technology, wherein the time and/or frequency synchronization message is used to obtain synchronization information for a second RF technology;
transmit, to the second wireless communication device, a first set of ranging measurement signals associated with the second RF technology;
receive, from the second wireless communication device, a second set of ranging measurement signals associated with the second RF technology,
wherein the time and/or frequency synchronization message and the first set of ranging measurement signals are transmitted in a first ranging slot, and wherein the second set of ranging measurement signals are received in a second ranging slot after the first ranging slot; and
wherein the one or more processors are further configured to cause the first wireless communication device to receive, from the second wireless communication device, a response message using the first RF technology, wherein the response message is received after transmitting the first set of ranging measurement signals and prior to receiving the second set of ranging measurement signals.

14. The first wireless communication device of claim 13, wherein the first wireless communication device is an initiator device, and wherein the second wireless communication device is a responder device.

15. The first wireless communication device of claim 13, wherein the first RF technology is a narrowband technology, and wherein the second RF technology is an ultrawideband technology.

16. The first wireless communication device of claim 13, wherein the one or more processors are further configured to cause the first wireless communication device to transmit, to the second wireless communication device, multiple ranging measurement signals over multiple milliseconds.

17. The first wireless communication device of claim 13, wherein the response message is received in the second ranging slot.

18. A first wireless communication device, comprising:
a memory; and
one or more processors, coupled to the memory, configured to cause the first wireless communication device to:
transmit, to a second wireless communication device, a time and/or frequency synchronization message using a first radio frequency (RF) technology, wherein the time and/or frequency synchronization message is used to obtain synchronization information for a second RF technology;
transmit, to the second wireless communication device, a first set of ranging measurement signals associated with the second RF technology;
receive, from the second wireless communication device, a second set of ranging measurement signals associated with the second RF technology,
wherein the time and/or frequency synchronization message is transmitted in a first set of one or more ranging slots, wherein the first set of ranging measurement signals are transmitted in a first ranging slot after the first set of one or more ranging slots, and wherein the second set of ranging measurement signals are received in a second ranging slot after the first ranging slot; and
wherein the one or more processors are further configured to cause the first wireless communication device to receive, from the second wireless communication device, a response message using the first RF technology, wherein the response message is received after transmitting the first set of ranging measurement signals and prior to receiving the second set of ranging measurement signals.

19. The first wireless communication device of claim 18, wherein the first wireless communication device is an initiator device, and wherein the second wireless communication device is a responder device.

20. The first wireless communication device of claim 18, wherein the first RF technology is a narrowband technology, and wherein the second RF technology is an ultrawideband technology.

21. The first wireless communication device of claim 18, wherein the one or more processors are further configured to cause the first wireless communication device to transmit, to the second wireless communication device, multiple ranging measurement signals over multiple milliseconds.

22. The first wireless communication device of claim 18, wherein the response message is received in a second set of one or more ranging slots between the first ranging slot and the second ranging slot.

23. A first wireless communication device, comprising:
a memory; and
one or more processors, coupled to the memory, configured to cause the first wireless communication device to:
transmit, to a second wireless communication device, a time and/or frequency synchronization message using a first radio frequency (RF) technology, wherein the time and/or frequency synchronization message is used to obtain synchronization information for a second RF technology;
transmit, to the second wireless communication device, a first set of ranging measurement signals associated with the second RF technology;
receive, from the second wireless communication device, a second set of ranging measurement signals associated with the second RF technology,
wherein the time and/or frequency synchronization message is transmitted in a first set of one or more ranging slots, wherein each ranging measurement signal of the first set of ranging measurement signals is transmitted in a corresponding ranging slot after the first set of one or more ranging slots, and wherein each ranging measurement signal of the second set of ranging measurement signals is received in a corresponding ranging slot after transmission of the first set of ranging measurement signals; and
wherein the one or more processors are further configured to cause the first wireless communication device to receive, from the second wireless communication device, a response message using the first RF technology, wherein the response message is received after transmitting the first set of ranging measurement signals and prior to receiving the second set of ranging measurement signals.

24. The first wireless communication device of claim 23, wherein the first wireless communication device is an initiator device, and wherein the second wireless communication device is a responder device.

25. The first wireless communication device of claim 23, wherein the first RF technology is a narrowband technology, and wherein the second RF technology is an ultrawideband technology.

26. The first wireless communication device of claim 23, wherein the one or more processors are further configured to cause the first wireless communication device to transmit, to the second wireless communication device, multiple ranging measurement signals over multiple milliseconds.

27. The first wireless communication device of claim 23, wherein the response message is received in a second set of one or more ranging slots between transmission of the first set of ranging measurement signals and reception of the second set of ranging measurement signals.

* * * * *